United States Patent
Mani et al.

(10) Patent No.: US 11,106,327 B2
(45) Date of Patent: Aug. 31, 2021

(54) SYSTEM AND METHOD FOR PROVIDING REAL-TIME PRODUCT INTERACTION ASSISTANCE

(71) Applicant: MIDEA GROUP CO., LTD., Foshan (CN)

(72) Inventors: Suresh Mani, San Jose, CA (US); Yujie Zhu, San Jose, CA (US); Eyoha Girma, San Jose, CA (US); Chien-Hwa Hwang, San Jose, CA (US)

(73) Assignee: MIDEA GROUP CO., LTD., Foshan (CN)

( * ) Notice: Subject to any disclaimer, the term of this patent is extended or adjusted under 35 U.S.C. 154(b) by 212 days.

(21) Appl. No.: 16/243,870

(22) Filed: Jan. 9, 2019

(65) Prior Publication Data

US 2020/0117335 A1   Apr. 16, 2020

Related U.S. Application Data

(63) Continuation of application No. PCT/CN2018/110282, filed on Oct. 15, 2018.

(51) Int. Cl.
   *G06F 3/0481*    (2013.01)
   *G06F 3/01*      (2006.01)
   (Continued)

(52) U.S. Cl.
   CPC .......... *G06F 3/04815* (2013.01); *G06F 3/017* (2013.01); *G06F 3/04845* (2013.01);
   (Continued)

(58) Field of Classification Search
   CPC .......... G06F 3/011; G06F 3/012; G06F 3/017; G06F 3/0304; G06F 3/04815;
   (Continued)

(56) References Cited

U.S. PATENT DOCUMENTS

| 2014/0201023 A1* | 7/2014 | Tang | G06Q 30/0633 |
|---|---|---|---|
| | | | 705/26.5 |
| 2016/0189426 A1* | 6/2016 | Thomas | G06F 3/011 |
| | | | 345/633 |

(Continued)

FOREIGN PATENT DOCUMENTS

| CN | 102226880 A | 10/2011 |
|---|---|---|
| CN | 105320262 A | 2/2016 |

(Continued)

OTHER PUBLICATIONS

Midea Group Co. Ltd., International Search Report and Written Opinion, PCT/CN2018/110282, dated Jul. 8, 2019, 9 pgs.

*Primary Examiner* — Jennifer N To
*Assistant Examiner* — Ashley M Fortino
(74) *Attorney, Agent, or Firm* — Morgan, Lewis & Bockius LLP

(57) ABSTRACT

A method for providing real-time virtual experience of user interactions includes rendering a 3-D virtual environment based on one or more images of a physical environment including one or more representations of physical objects, receiving a user input to place a first preset virtual object at a space in the 3-D virtual environment, rendering the first preset virtual object, detecting, by the one or more cameras, a user's hand gesture interacting with the first preset virtual object, translating the user's hand gesture into an interaction with the first preset virtual object, identifying a first part of the first preset virtual object that is subject to the interaction with the first preset virtual object, concurrently displaying in real time on the display a representation of the user's hand gesture and a movement of the first part of the first preset virtual object caused by the interaction in the 3-D virtual environment.

17 Claims, 25 Drawing Sheets

(51) Int. Cl.
*G06Q 30/06* (2012.01)
*G06F 3/0484* (2013.01)
*G06F 16/955* (2019.01)
*G06F 9/451* (2018.01)
*G06F 16/904* (2019.01)
*G06K 9/00* (2006.01)

(52) U.S. Cl.
CPC ............ *G06F 9/453* (2018.02); *G06F 16/904* (2019.01); *G06F 16/9554* (2019.01); *G06K 9/00302* (2013.01); *G06Q 30/0643* (2013.01); *G06F 2203/04806* (2013.01)

(58) Field of Classification Search
CPC .. G06F 3/04842; G06F 3/04845; G06F 9/452; G06F 9/453; G06F 16/904; G06F 16/955; G06F 2203/04806; G06F 8/60; G06F 8/38; G06K 9/00302; G06K 9/00671; G06K 9/00355; G06Q 30/0643
See application file for complete search history.

(56) References Cited

U.S. PATENT DOCUMENTS

| | | | |
|---|---|---|---|
| 2016/0378286 A1 | 12/2016 | Ke | |
| 2017/0131085 A1* | 5/2017 | Hillebrand | H04N 13/243 |
| 2017/0148221 A1* | 5/2017 | Lyren | G06F 3/012 |
| 2018/0330544 A1* | 11/2018 | Corso | G06K 9/00671 |
| 2019/0029528 A1* | 1/2019 | Tzvieli | A61B 5/015 |

FOREIGN PATENT DOCUMENTS

| | | |
|---|---|---|
| CN | 107977070 A | 5/2018 |
| WO | WO2017122944 A1 | 7/2017 |

* cited by examiner

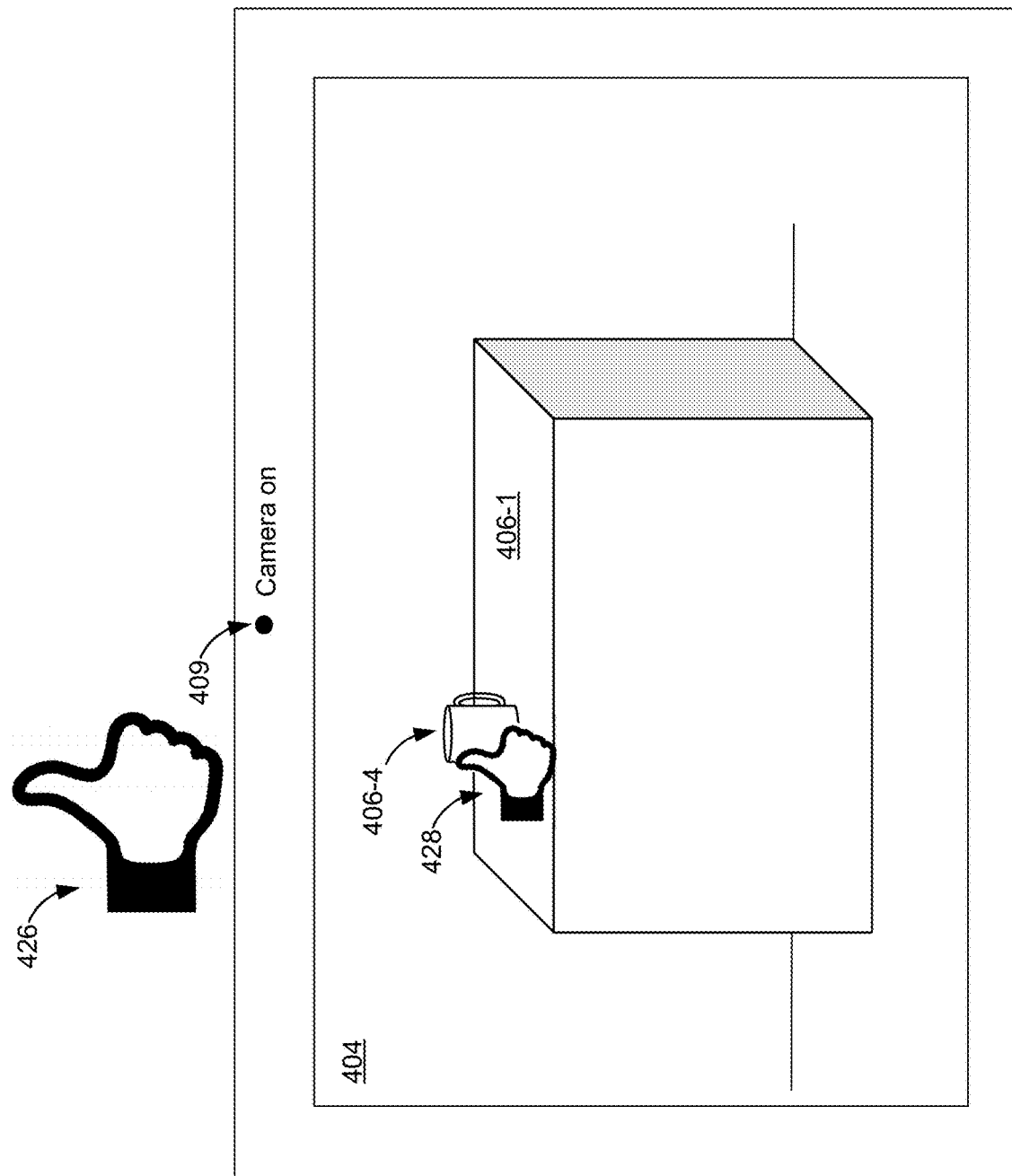

SYSTEM AND METHOD FOR PROVIDING REAL-TIME PRODUCT INTERACTION ASSISTANCE

CROSS REFERENCE TO RELATED APPLICATION

This application is a continuation application of PCT Patent Application No. PCT/CN2018/110282, entitled "SYSTEM AND METHOD FOR PROVIDING REAL-TIME PRODUCT INTERACTION ASSISTANCE" filed on Oct. 15, 2018, which is incorporated herein by reference in its entirety.

FIELD OF THE TECHNOLOGY

The present disclosure relates to home appliances, in particular, to providing real-time virtual interactions with appliance products, and providing virtual aids for user interaction with appliance products.

BACKGROUND OF THE TECHNOLOGY

In a day and age where e-commerce become increasing popular, many product venders devote a large amount of resources on developing and using on-line sales platforms that present images of products in a listing, and facilitate sales by providing product descriptions, online reviews, and information videos on individual product pages. Although online sales platforms also provide an avenue for sales of home appliances, conventional online sales platforms cannot meet users' desire to try out home appliances, to learn about their many features, to have virtual interaction experience with the home appliances, or to see the home appliance operating in a virtual environment that mimics the intended operating environment of the users' homes. Virtual/augmented reality (VR/AR) environments include at least some virtual elements that represent or augment a corresponding object in the physical world. However, conventional VR/AR technologies are inefficient, and do not integrate a virtual product well in a virtual environment. Moreover, user inputs (e.g., detected via various sensors) are used to detect user interactions with the virtual objects, which is less intuitive and less efficient.

Therefore, an efficient and more intuitive method and system of providing real-time virtual experience associated user interactions with objects is needed.

SUMMARY

Accordingly, there is a need for computer systems with improved methods and interfaces for rendering in real time the user's interactions within augmented and virtual reality (VR/AR) environments using user's hand gestures. Such methods and interfaces optionally complement or replace conventional methods for interacting with VR/AR environments. The above deficiencies and other problems associated with user interfaces for VR/AR are reduced or eliminated by the disclosed computer systems. For example, such methods and interfaces provides the user with vivid virtual experience in interacting with one or more objects in AR/VR environment using hand gestures. The methods and interfaces further provide user with virtual aid templates displayed concurrently with virtual views of a product to facilitate fixing the product or assembling the product using user's hand gestures.

As disclosed herein, in some embodiments, a method of providing real-time virtual experience of user interactions with objects (e.g., virtual shopping/product experience) includes: at an electronic device (e.g., a user device) having a display, one or more cameras, one or more processors, and memory: rendering, on the display, a 3-D virtual environment based on one or more images of a physical environment, wherein the 3-D virtual environment includes one or more representations of physical objects placed in the physical environment; receiving a user input to place a first preset virtual object at a space in the 3-D virtual environment corresponding to a space in the physical environment; rendering, in response to the user input, the first preset virtual object placed in the space in the 3-D virtual environment; detecting, by the one or more cameras, a user's hand gesture interacting with the first preset virtual object in the 3-D virtual environment; in response to detecting the user's hand gesture: translating the user's hand gesture into an interaction with the first preset virtual object in the 3-D virtual environment; identifying, in the 3-D virtual environment, a first part of the first preset virtual object in the virtual environment that is subject to the interaction with the first preset virtual object in the virtual environment; concurrently displaying in real time on the display: a representation of the user's hand gesture in the 3-D virtual environment; and a movement of the first part of the first preset virtual object caused by the interaction with the first preset virtual object in the 3-D virtual environment.

As disclosed herein, in some embodiments, a method of providing virtual guide for user interactions with objects (e.g., onsite troubleshoot and repair) includes: at an electronic device (e.g., a user device) having a display, one or more cameras, one or more processors, and memory: capturing, using the one or more cameras, one or more images of a physical environment including a physical object placed at a first location; while the one or more cameras capture the one or more images, rendering, in real time, a 3-D virtual environment based on the one or more images of the physical environment, wherein the 3-D virtual environment includes a representation of the physical object in a location of the virtual environment corresponding to the first location in the physical environment; capturing, by the one or more cameras, a first hand gesture in the physical environment; in response to capturing the first hand gesture by the one or more cameras: translating the first hand gesture into a first operation of displaying a virtual aid template associated with the physical object in the virtual environment; rendering, in real time on the display, the virtual aid template associated with the physical object adjacent to the location of the representation of the physical object in the 3-D virtual environment; capturing, by the one or more cameras, a second hand gesture in the physical environment; in response to capturing the second hand gesture by the one or more cameras: translating the second hand gesture into a first interaction with the representation of the physical object in the 3-D virtual environment; determining a second operation on the virtual aid template associated with the physical object in accordance with the first interaction with the representation of the physical object; and rendering, in real time on the display, the second operation on the virtual aid template associated with the physical object.

In accordance with some embodiments, an electronic device includes a display, one or more cameras, one or more processors, and memory storing one or more programs; the one or more programs are configured to be executed by the one or more processors and the one or more programs include instructions for performing or causing performance of the operations of any of the methods described herein. In accordance with some embodiments, a computer readable storage medium has stored therein instructions, which, when executed by an electronic device, cause the device to perform or cause performance of the operations of any of the methods described herein. In accordance with some embodiments, an electronic device includes means for performing or causing performance of the operations of any of the methods described herein. In accordance with some embodiments, an information processing apparatus, for use in an electronic device includes means for performing or causing performance of the operations of any of the methods described herein.

Various additional advantages of the present application are apparent in light of the descriptions below.

BRIEF DESCRIPTION OF THE DRAWINGS

The aforementioned features and advantages of the disclosed technology as well as additional features and advantages thereof will be more clearly understood hereinafter as a result of a detailed description of preferred embodiments when taken in conjunction with the drawings.

To describe the technical solutions in the embodiments of the present disclosed technology or in the prior art more clearly, the following briefly introduces the accompanying drawings required for describing the embodiments or the prior art. Apparently, the accompanying drawings in the following description show merely some embodiments of the present disclosed technology, and persons of ordinary skill in the art may still derive other drawings from these accompanying drawings without creative efforts.

FIGS. 4A-4L illustrate examples of systems and user interfaces for providing real-time virtual experience of user interactions with objects in accordance with some embodiments.

Like reference numerals refer to corresponding parts throughout the several views of the drawings.

DESCRIPTION OF EMBODIMENTS

Figure 1:
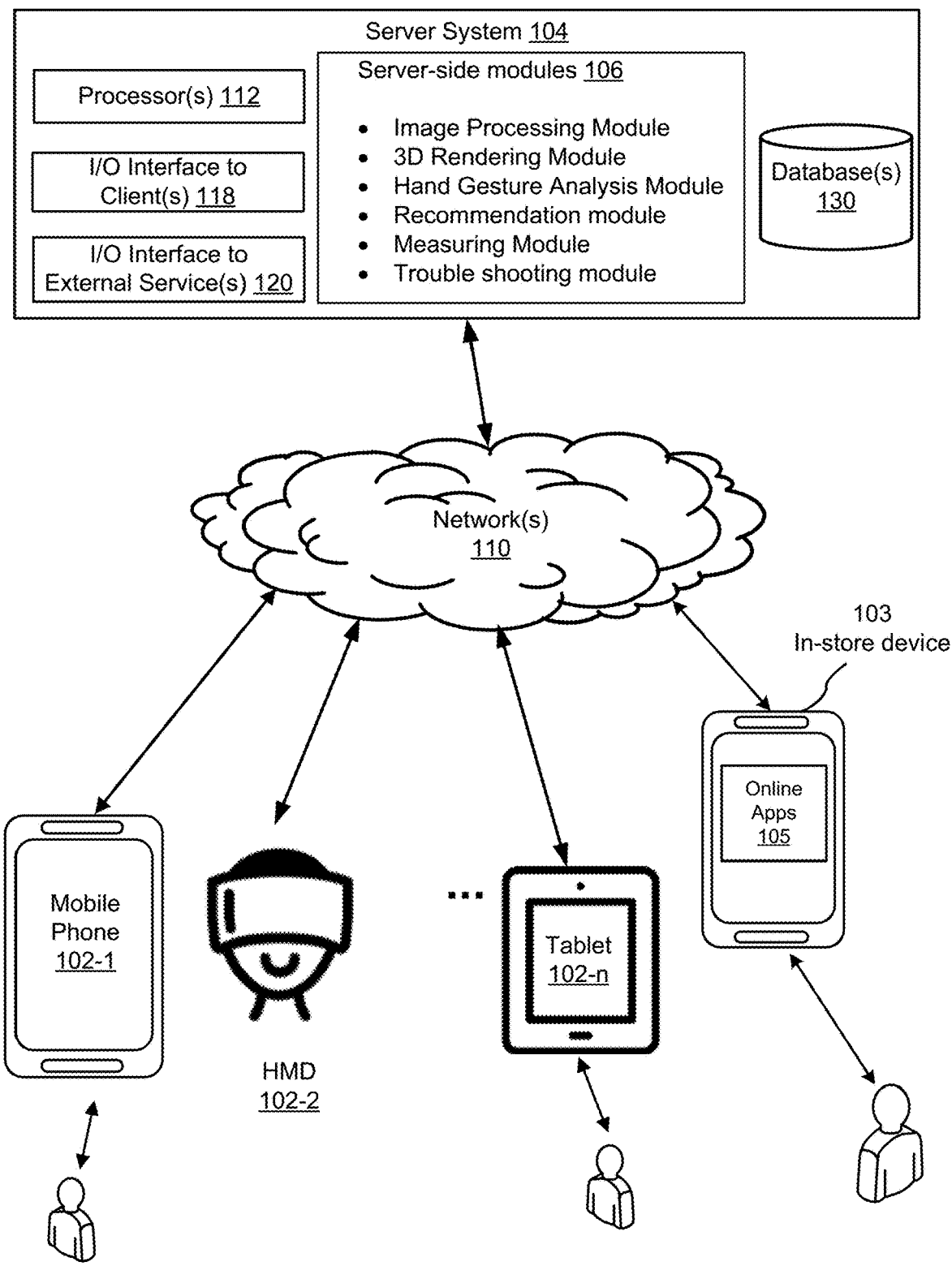
FIG. 1 is a block diagram illustrating an operating environment for providing real-time virtual experience and virtual guide for user interactions with objects, in accordance with some embodiments.

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. In other instances, well-known methods, procedures, components, and circuits have not been described in detail so as not to unnecessarily obscure aspects of the embodiments.

The following clearly and completely describes the technical solutions in the embodiments of the present application with reference to the accompanying drawings in the embodiments of the present application. The described embodiments are merely a part rather than all of the embodiments of the present application. All other embodiments obtained by persons of ordinary skill in the art based on the embodiments of the present application without creative efforts shall fall within the protection scope of the present application.

As shown in FIG. 1A, a virtual image processing and rendering system 100 (e.g., including a server system 104 and one or more user devices 102) is implemented in accordance with a server-client interaction model in accordance with some embodiments. In accordance with some embodiments, the server-client interaction model includes client-side modules (not shown) executed on respective user devices 102-1, 102-2 ... 102-n, that are deployed at various deployment locations (e.g., brick and mortar stores, roadshow booths, product demonstration sites, product testing sites, product design and producing sites, exhibition halls, at user's home, in user's kitchen, in user's office, onsite troubleshooting a machine, etc.). In some embodiments, the server-client interaction model further includes various server-side modules 106 (also referred to as the "backend modules 106") executed on a server system 104. The client-side modules (not shown) communicate with the server module 106 through one or more networks 110. The client-side modules provide user-side functionalities for the virtual image processing and rendering system 100 and communicate with the server-side module 106. The server-side module 106 provides server-side functionalities for the virtual image processing and rendering system 100 for any number of client-side modules each residing on a user device 102 (e.g., a user's mobile phone 102-1, a head-mounted display (HMD) 102-2 ... a user's tablet 102-n, etc.).

In some embodiments, the server system 104 includes one or more processing modules 106 (e.g., including, but not limited to image processing module, 3D rendering module, hand gesture analysis module, recommendation module, measuring module, troubleshooting module, etc.), one or more processors 112, one or more databases 130 storing data and models (e.g., hand gesture data and hand gesture recognition models, facial expression data and facial expression recognition models, troubleshooting data and machine errors identification models, customer transaction data, user profile data and product recommendation models, etc.), I/O interface 118 to one or more client devices 102, and an I/O interface 120 to one or more external services (not shown) (e.g., machine manufacturers, component suppliers, ecommerce, or social networking platform(s)) on their individual user devices 103 (e.g., smart phones, tablet devices, and personal computers)) or other types of online interactions (e.g., user interacting with the virtual image processing and rendering system 100 through online sales/marketing channel (e.g., ecommerce apps or social networking apps 105) on their individual user devices 103 (e.g., smart phones, tablet devices, and personal computers located in the sale store)). In some embodiments, the I/O interface 118 to client-side modules facilitates the client-side input and output processing for the client-side modules on respective client devices 102 and the modules on the in-store device 103. In some embodiments, the one or more server-side modules 106 utilize the various real-time data obtained through various internal and external services, real-time data received from the client devices (e.g., captured image data), and existing data stored in the various databases, to render 3-D virtual images concurrently with hand gestures interacting with virtual objects, and/or to guide the user interactions with virtual aid templates using hand gestures at various deployment locations (e.g., at user's home or in a store) of the user device 102 and generate product recommendations to the users.

Examples of the user device 102 include, but are not limited to, a cellular telephone, a smart phone, a handheld computer, a wearable computing device (e.g., a HMD), a personal digital assistant (PDA), a tablet computer, a laptop computer, a desktop computer, an enhanced general packet radio service (EGPRS) mobile phone, a media player, a navigation device, a game console, a television, a remote control, a point of sale (POS) terminal, vehicle-mounted computer, an ebook reader, an on-site computer kiosk, a mobile sales robot, a humanoid robot, or a combination of any two or more of these data processing devices or other data processing devices. As discussed with reference to FIG. 2B, a respective user device 102 can include one or more client-side modules that perform similar functions as those discussed in server-side modules 106. The respective user device 102 can also include one or more databases storing various types of data that are similar to the databases 130 of the server system 104.

Examples of one or more networks 110 include local area networks (LAN) and wide area networks (WAN) such as the Internet. One or more networks 110 are, optionally, implemented using any known network protocol, including various wired or wireless protocols, such as Ethernet, Universal Serial Bus (USB), FIREWIRE, Long Term Evolution (LTE), Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

In some embodiments, the server system 104 is implemented on one or more standalone data processing apparatuses or a distributed network of computers. In some embodiments, the server system 104 also employs various virtual devices and/or services of third-party service providers (e.g., third-party cloud service providers) to provide the underlying computing resources and/or infrastructure resources of the backend information exchange system 108. In some embodiments, the server system 104 includes, but is not limited to, a handheld computer, a tablet computer, a laptop computer, a desktop computer, a server computer, or a combination of any two or more of these data processing devices or other data processing devices.

In some embodiments, the server system 104 also implements various modules for supporting the user interactions and product recommendations to the user. In some embodiments, the server system 104 includes audio/video processing services, natural language processing services, model building services, statistical analysis services, data mining services, data collection services, and product recommendation services, etc., based on various statistical techniques, rule-based techniques, and artificial intelligence-based techniques.

The virtual image processing and rendering system 100 shown in FIG. 1 includes both a client-side portion (e.g., the client-side module on client device 102) and a server-side portion (e.g., the server-side modules 106). In some embodiments, data processing is implemented as a standalone application installed on a client-side device 102 that is deployed at a deployment location that physically displays a plurality of actual products (e.g., home appliances, furniture, heavy equipment, vehicles, etc.), where the user is physically present at the location and directly interacts with the client-side device(s) and the products. In some other embodiments, the user is located remotely from the deployment location that physically displays a plurality of actual products (e.g., the user is at home doing online virtual shopping). In addition, the division of functionalities between the client and server portions of virtual image processing and rendering system 100 can vary in different embodiments. For example, in some embodiments, the client-side module is a thin-client that provides only user interface input (e.g., capturing user hand gestures using cameras) and output (e.g., image rendering) processing functions, and delegates all other data processing functionalities to a backend server (e.g., the server system 104). Although many aspects of the present technology are described from the perspective of the backend system, the corresponding actions performed by the frontend system would be apparent to ones skilled in the art without any creative efforts. Similarly, although many aspects of the present technology are described from the perspective of the client-side system, the corresponding actions performed by the backend server system would be apparent to ones skilled in the art without any creative efforts. Furthermore, some aspects of the present technology may be performed by the server, the client device, or the server and the client cooperatively. In some embodiments, some of the databases storing various types of data are distributed at various locations that are local to some of the frontend systems, which enable faster data access and local data processing time.

Figure 2A:
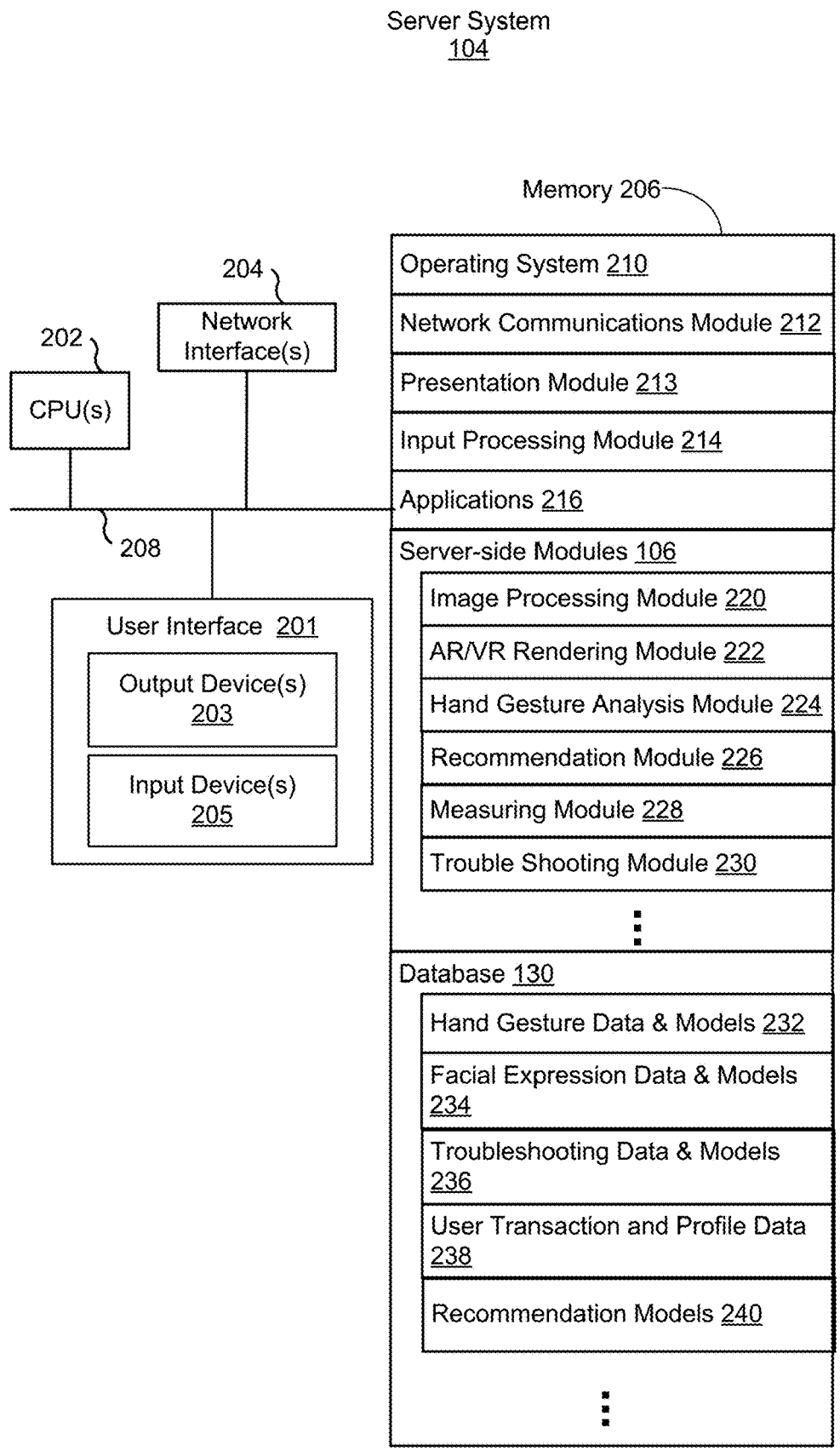
FIG. 2A is a block diagram of a server system in accordance with some embodiments.

FIG. 2A is a block diagram illustrating a representative server system 104 in accordance with some embodiments. Server 104, typically, includes one or more processing units (CPUs) 202 (e.g., processors 112 in FIG. 1), one or more network interfaces 204, memory 206, and one or more communication buses 208 for interconnecting these components (sometimes called a chipset). Server 104 also optionally includes a user interface 201. User interface 201 includes one or more output devices 203 that enable presentation of media content, including one or more speakers and/or one or more visual displays. User interface 201 also includes one or more input devices 205, including user interface components that facilitate user input such as a keyboard, a mouse, a voice-command input unit or microphone, a touch screen display, a touch-sensitive input pad, a gesture capturing camera, or other input buttons or controls. Memory 206 includes high-speed random access memory, such as DRAM, SRAM, DDR RAM, or other random access solid-state memory devices; and, optionally, includes non-volatile memory, such as one or more magnetic disk storage devices, one or more optical disk storage devices, one or more flash memory devices, or one or more other non-volatile solid-state storage devices. Memory 206, optionally, includes one or more storage devices remotely located from one or more processing units 202. Memory 206, or alternatively the non-volatile memory within memory 206, includes a non-transitory computer readable storage medium. In some implementations, memory 206, or the non-transitory computer readable storage medium of memory 206, stores the following programs, modules, and data structures, or a subset or superset thereof:

operating system 210 including procedures for handling various basic system services and for performing hardware dependent tasks;

network communication module 212 for connecting server 104 to other computing devices (e.g., client devices 102 or third-party services) connected to one or more networks 110 via one or more network interfaces 204 (wired or wireless);

presentation module 213 for enabling presentation of information (e.g., a user interface for application(s), widgets, web pages, audio and/or video content, text, etc.) at server 104 via one or more output devices 203 (e.g., displays, speakers, etc.) associated with user interface 210;

input processing module 214 for detecting one or more user inputs or interactions from one of the one or more input devices 205 and interpreting the detected input or interaction;

one or more applications 216 for execution by server 104;

server-side modules 106, which provides server-side data processing and functionalities, including but not limited to:

image processing module 152 for processing user's hand gesture data, facial expression data, object data, and/or camera data, etc. during calibration and real-time virtual image rendering process, the image processing module may perform real-time image segmentation, real-time depth analysis, object position/movement analysis, etc.;

augmented reality (AR) and virtual reality (VR) processing and rendering module 222 for generating AR and VR experiences for the user based on the products or virtual representation of the products that user interact with, products recommended to the user, products the user requests, and the user's characteristics, preferences, interaction styles, etc.

hand gesture analysis module 224 for analyzing hand gesture data to recognize various hand gestures based on gesture data, position/depth data, and contour data, etc., the hand gesture analysis module 224 can also build hand gesture models based on hand gesture data obtained through calibration process, and these hand gesture models can be updated during real-time virtual image processing and rendering process;

recommendation module 226 for making product recommendations based on product, space, and environment dimensions, appearance, color, theme, user's facial expressions, etc. and for building and maintaining corresponding recommendation models using appropriate data;

measuring module 228 for measuring dimensions of one or more objects, spaces, and the environment (e.g., user's kitchen) using camera data (e.g., depth information) and/or image data (comparing pixel numbers of an object with known size with an object with unknown size);

trouble shooting module 230 for identifying product errors/defects using various models, building and maintaining troubleshooting models based on common problems with the machine v. error characteristics, and selecting fixing guide to be rendered to facilitate user's fixing; and other modules for performing other functions set forth herein; and server-side database 130, which stores data and related models, including but not limited to:

hand gesture data captured by the cameras and processed by the image processing module (e.g., including, but not limited to, hand contour data, hand position data, hand size data, hand depth data associated with various hand gestures), and hand gesture recognition models 232 (e.g., built during a calibration process and updated during real-time user interaction with virtual environment using hand gestures);

facial expression data and facial expression identifying models 234 built based on facial expression data of a user towards one or more products;

troubleshooting data, including image data related to mechanical errors, malfunctions, electronic component defects, circuit errors, compression malfunctions, etc., and problem identification models (e.g., machine error identification models);

user transaction and profile data 238 (e.g., customer name, age, income level, color preference, previously purchased product, product category, product combination/bundle, previous inquired product, past delivery location, interaction channel, location of interaction, purchase time, delivery time, special requests, identity data, demographic data, social relationships, social network account names, social network publication or comments, interaction records with sales representatives, customer service representatives, or delivery personnel, preferences, dislikes, sentiment, beliefs, superstitions, personality, temperament, interaction style, etc.); and recommendation models 240 including various types of recommendation models such as dimension-based product recommendation models, user's facial expression-based product recommendation models, user data and purchase history based recommendation models, etc.

Each of the above-identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 406, optionally, stores a subset of the modules and data structures identified above. Furthermore, memory 806, optionally, stores additional modules and data structures not described above.

In some embodiments, at least some of the functions of server system 108 are performed by client device 104, and the corresponding sub-modules of these functions may be located within client device 104 rather than server system 108. In some embodiments, at least some of the functions of client device 104 are performed by server system 108, and the corresponding sub-modules of these functions may be located within server system 108 rather than client device 104. Client device 104 and server system 108 shown in the Figures are merely illustrative, and different configurations of the modules for implementing the functions described herein are possible in various embodiments.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Figure 2B:
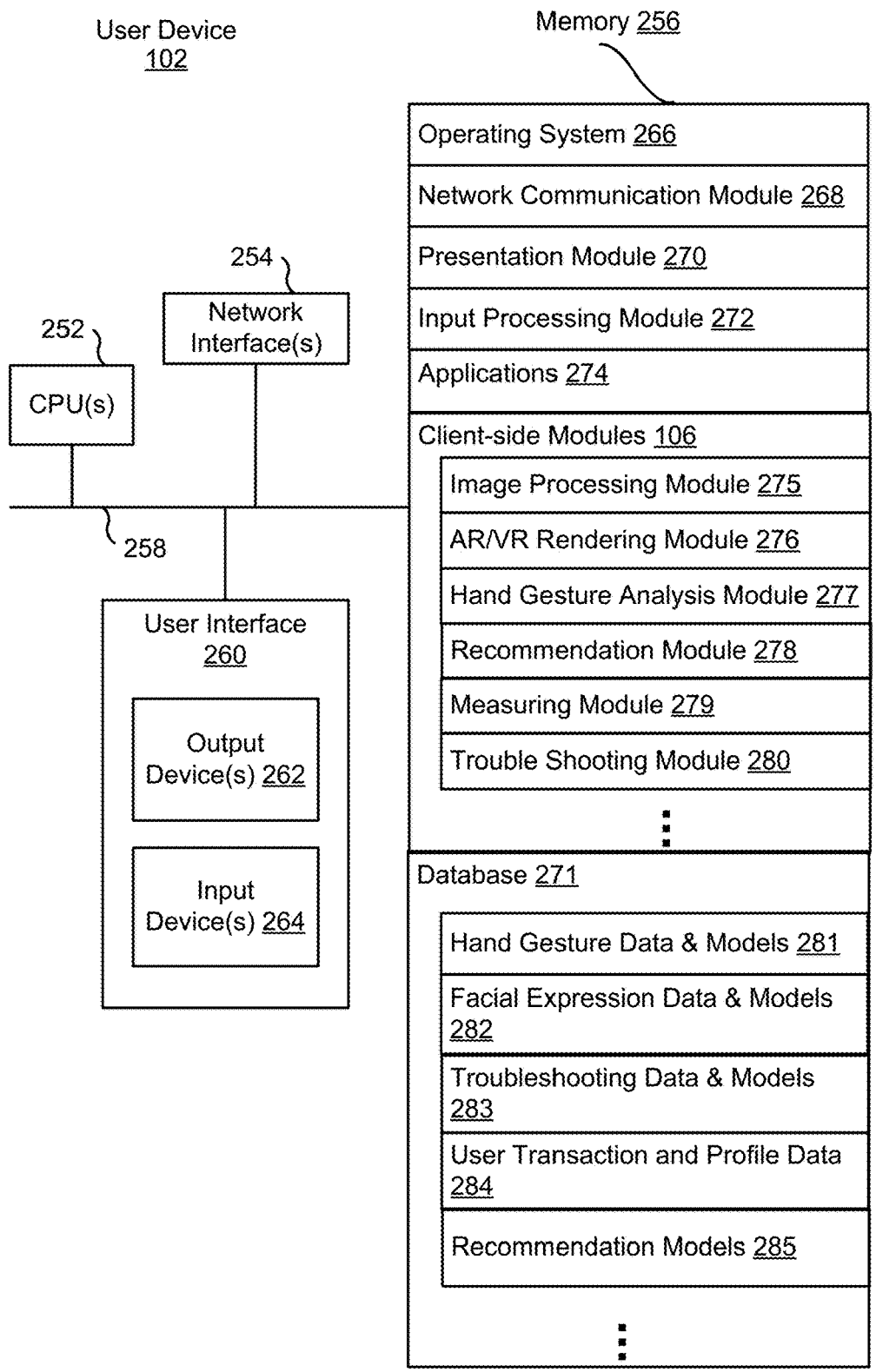
FIG. 2B is a block diagram of a client device in accordance with some embodiments.

FIG. 2B is a block diagram illustrating a representative client device 102 in accordance with some embodiments. Client device 104, typically, includes one or more processing units (CPUs) 252 (e.g., processors), one or more network interfaces 254, memory 256, and one or more communication buses 258 for interconnecting these components (sometimes called a chipset). Client device 102 also includes a user interface 260. User interface 260 includes one or more output devices 262 that enable presentation of media content, including one or more speakers and/or one or more visual displays. User interface 260 also includes one or more input devices 264, including user interface components that facilitate user input such as a keyboard, a mouse, a voice-command input unit or microphone, a touch screen display, a touch-sensitive input pad, a gesture capturing camera, one or more cameras, depth camera, or other input buttons or controls. Furthermore, some client devices 102 use a microphone and voice recognition or a camera and gesture recognition to supplement or replace the keyboard. In some embodiments, client device 102 further includes sensors, which provide context information as to the current state of client device 102 or the environmental conditions associated with client device 102. Sensors include but are not limited to one or more microphones, one or more cameras, an ambient light sensor, one or more accelerometers, one or more gyroscopes, a GPS positioning system, a Bluetooth or BLE system, a temperature sensor, one or more motion sensors, one or more biological sensors (e.g., a galvanic skin resistance sensor, a pulse oximeter, and the like), and other sensors. Memory 256 includes high-speed random access memory, such as DRAM, SRAM, DDR RAM, or other random access solid-state memory devices; and, optionally, includes non-volatile memory, such as one or more magnetic disk storage devices, one or more optical disk storage devices, one or more flash memory devices, or one or more other non-volatile solid-state storage devices. Memory 256, optionally, includes one or more storage devices remotely located from one or more processing units 252. Memory 256, or alternatively the non-volatile memory within memory 256, includes a non-transitory computer readable storage medium. In some implementations, memory 256, or the non-transitory computer readable storage medium of memory 256, stores the following programs, modules, and data structures, or a subset or superset thereof:

operating system 266 including procedures for handling various basic system services and for performing hardware dependent tasks;
  network communication module 268 for connecting client device 102 to other computing devices (e.g., server system 104) connected to one or more networks 110 via one or more network interfaces 254 (wired or wireless);
  presentation module 270 for enabling presentation of information (e.g., a user interface for presenting text, images, video, webpages, audio, etc.) at client device 102 via one or more output devices 262 (e.g., displays, speakers, etc.) associated with user interface 260;
  input processing module 272 for detecting one or more user inputs or interactions from one of the one or more input devices 264 and interpreting the detected input or interaction;
  one or more applications 274 for execution by client device 102 (e.g., payment platforms, media player, and/or other web or non-web based applications);
  client-side modules 106, which provides client-side data processing and functionalities, including but not limited to:
    image processing module 275 for processing user's hand gesture data, facial expression data, object data, and/or camera data, etc.;
    augmented reality (AR) and virtual reality (VR) processing and rendering module 276 for generating AR and VR experiences for the user based on the products or virtual representation of the products that user interact with;
    hand gesture analysis module 277 for analyzing hand gesture data to recognize various hand gestures based on gesture data, position/depth data, and contour data, etc.;
    recommendation module 278 for making product recommendations based on product, space, and environment dimensions, appearance, color, theme, user's facial expressions, etc.;
    measuring module 279 for measuring dimensions of one or more objects, spaces, and the environment (e.g., user's kitchen) using camera data (e.g., depth information) and/or image data (comparing pixel numbers of an object with known size with an object with unknown size);
    trouble shooting module 280 for identifying product errors/defects using various models, and selecting fixing guide to be rendered to facilitate user's fixing; and
    other modules for performing other functions set forth herein; and
  client-side database 271, storing data and models, including but not limited to:
    hand gesture data captured by the cameras and processed by the image processing module (e.g., including, but not limited to, hand contour data, hand position data, hand size data, hand depth data associated with various hand gestures), and hand gesture recognition models 281 (e.g., built during a calibration process and updated during real-time user interaction with virtual environment using hand gestures);
    facial expression data and facial expression identifying models 282 built based on facial expression data of a user towards one or more products;
    troubleshooting data, including image data related to mechanical errors, malfunctions, electronic component defects, circuit errors, compression malfunctions, etc., and problem identification models (e.g., machine error identification models) 283;
    user transaction and profile data 284 (e.g., customer name, age, income level, color preference, previously purchased product, product category, product combination/bundle, previous inquired product, past delivery location, interaction channel, location of interaction, purchase time, delivery time, special requests, identity data, demographic data, social relationships, social network account names, social network publication or comments, interaction records with sales representatives, customer service representatives, or delivery personnel, preferences, dislikes, sentiment, beliefs, superstitions, personality, temperament, interaction style, etc.); and
    recommendation models 285 including various types of recommendation models such as dimension-based product recommendation models, user's facial expression-based product recommendation models, user data and purchase history based recommendation models, etc.

Each of the above-identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 256, optionally, stores a subset of the modules and data structures identified above. Furthermore, memory 256, optionally, stores additional modules and data structures not described above.

In some embodiments, at least some of the functions of server system 104 are performed by client device 102, and the corresponding sub-modules of these functions may be located within client device 102 rather than server system 104. In some embodiments, at least some of the functions of client device 102 are performed by server system 104, and the corresponding sub-modules of these functions may be located within server system 104 rather than client device 102. Client device 102 and server system 104 shown in the Figures are merely illustrative, and different configurations of the modules for implementing the functions described herein are possible in various embodiments.

In some embodiments, the image processing module 220 or 275 which includes a plurality of machine learning models for analyzing the images (e.g., of hand gestures) from the one or more cameras, and provide parameters deduced from the image analysis performed on the images, such as the contours of user's hand, hand size, hand shape, hand movement, depth information. In some embodiments, the image processing module optionally include some components locally at the client device 102, and some components remotely at the server 104. In some embodiments, the image processing module is entirely located on the server 104.

In some embodiments, the virtual image processing and rendering system 100 continuously gathers image data (e.g., related to user hand gestures, during calibration process and real-time virtual image rendering and user interaction processes), processes image data, and mines data to improve the accuracy of the models and statistics, and decision-making intelligence. During a particular interaction with a customer, the virtual image processing and rendering system 100 utilizes feedback and information received from the individual customer to modify the selection and priority of the models and decision-making logic used to generate the predictions, interactions, and recommendations, thereby improving the data processing speed and efficiency, as well as improving the accuracy and effectiveness of the predictions, interactions, and recommendations. For example, the individual user's facial expression, reactions, sentiment, and intent (e.g., obtained via captured image including facial expressions, hand gestures, postures, etc.) are fed back to the virtual image processing and rendering system 100 in real-time to adding additional parameters to the analysis, prediction, and recommendation models, or reselect the set of models (e.g., removal, replacement, and/or addition of models) that are used to perform the analysis, prediction, and recommendations, and/or to redirect the decision-making intelligence/logic, etc.

In some embodiments, the recommendation module or the trouble shooting module builds models using various artificial intelligence techniques. For example, the corresponding module integrates the knowledge and conclusions from the different data sources and analysis methods, such as various machine learning algorithms and specially engineered decision logic and algorithms, and/or combinations thereof (e.g., various types of neural networks, deep neural networks, search and optimization analysis, rule-based decision logic, probabilistic methods and fuzzy logic, Bayesian networks, hidden Markov models, classifiers and statistical learning models, cybernetics, etc.), to determine the product recommendation or identify machine error, and uses the above to identify a subset of models and analysis tools to further generate the suitable responses to the user and provide the most relevant recommendations using as little computational resources as possible, and as quickly as possible.

In some embodiments, the virtual image processing and rendering system 100 is configured to provide an augmented reality experience and/or virtual reality experience (e.g., using various AR/VR technologies. In some embodiments, the user's reactions (e.g., verbal and facial expressions) to the AR and VR experience are processed and the results are used to modify the product recommendations and/or the AR and VR experiences. For example, if the user initially asked to try a first model of washing machine with the virtual reality setting, and was not able to figure out how to properly use the machine (e.g., manipulated multiple buttons and parts of the virtual washing machine with no apparent purpose for more than a threshold amount of time) and expressed frustration (e.g., through facial expressions which are captured by cameras), the virtual image processing and rendering system 100 takes that information as new inputs and generates a new recommendation for another model with simpler functionalities but similar characteristics otherwise (e.g., similar color and dimensions). Alternatively, if the user has a personal profile including facial expression data that suggests that the user is generally happy with products having many features in general, the virtual image processing and rendering system 100 recommends products that user previously showed satisfaction with. In some embodiments, the client-side device 102 generates a virtual representation of a physical environment, e.g., a kitchen, inside of the AR/VR environment, and concurrently generates virtual representation of user's hand gesture within the AR/VR environment. In some embodiments, the virtual image processing and rendering system 100 also generates virtual aid templates demonstrate how to fix, use or install the product in the AR/VR environment. In some embodiments, the virtual image processing and rendering system 100 allows the user to visualize one or more home appliances that are recommended to the user in their simulated home setup in the AR/VR environment.

FIGS. 3A-3D is a flowchart diagram of a method 300 of performing real time image processing of user's hand gestures captured by cameras, and concurrently rendering representations of the user's hand gestures and movements caused by the user's hand interaction with virtual objects in a virtual environment, in accordance with some embodiments. In some embodiments, one or more steps of the method 300 are performed by a server system (e.g., a server system 104, FIG. 1). In some embodiments, one or more steps of the method 300 are performed by a client device 102 (e.g., a smart phone 102-1, a HMD 102-2, or a tablet 102-n, FIG. 1). In some embodiments, method 300 is governed by instructions that are stored in a non-transitory computer readable storage medium and the instructions are executed by one or more processors of the client and/or server systems. The method 300 is discussed with reference to user interface (UI) FIGS. 4A-4L as below.

Figure 3A:
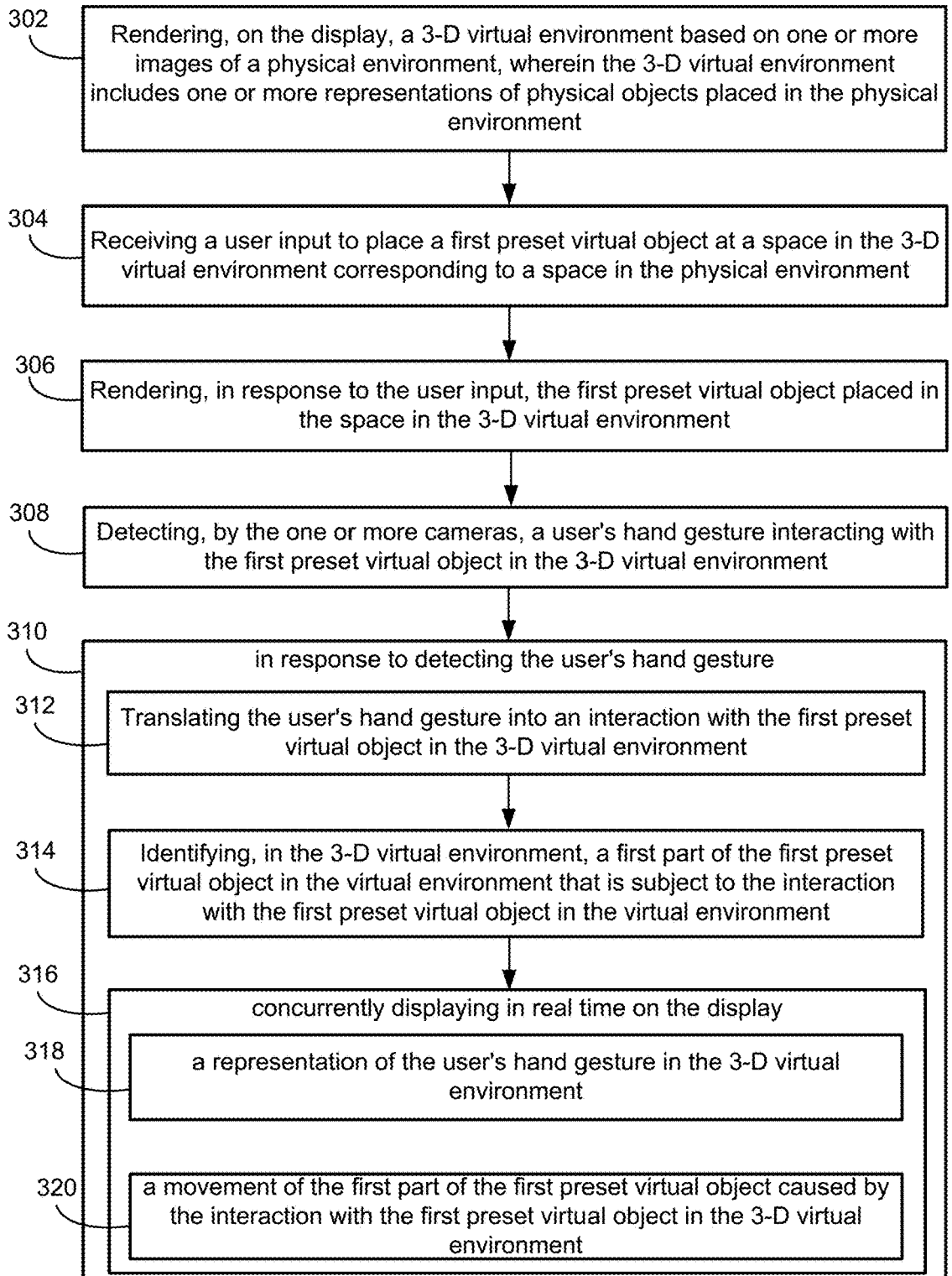
FIG. 3A-3D are a flowchart diagram of a method of providing real-time virtual experience of user interactions with objects in accordance with some embodiments.

In some embodiments as shown in FIG. 3A, the method 300 includes: at an electronic device (e.g., a client device 102, such as a mobile phone 102-1, a head-mounted display (HMD) 102-2, or a tablet 102-n), having a display, one or more cameras, one or more processors, and memory: rendering (302), on the display, a 3-D virtual environment (e.g., virtual image 404, FIG. 4A) based on one or more images (e.g., images 402-1 . . . 402-n, FIG. 4A) of a physical environment. In some embodiments, the 3-D virtual environment includes one or more representations of physical objects (e.g., 406-1, 406-2, and 406-3, FIG. 4A) placed in the physical environment.

Figure 4A:
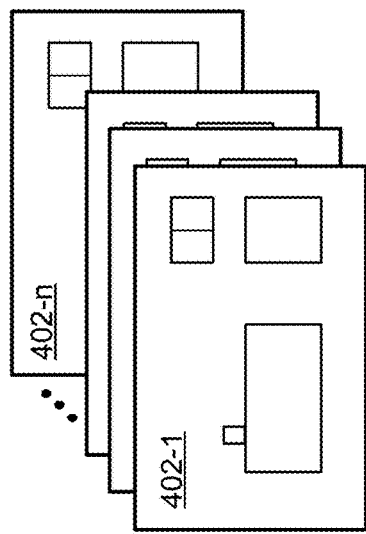
Figure 4A:
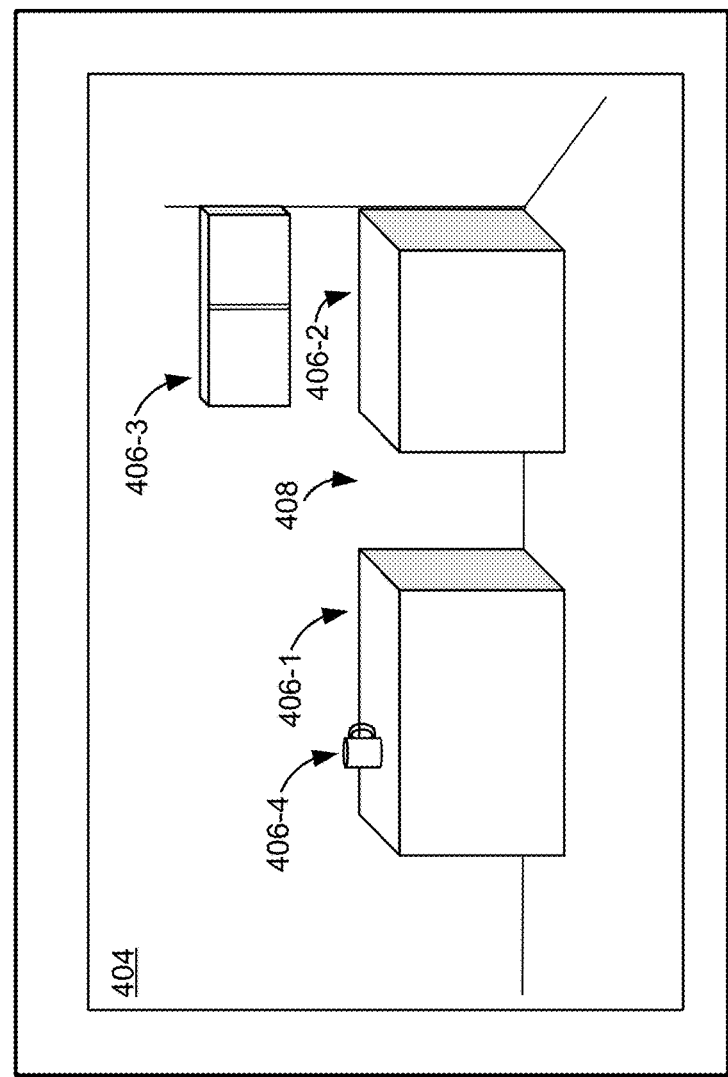

In some embodiments, as shown in FIG. 4A, the 3-D virtual environment 404 can be rendered in one or more virtual reality (VR) images, a VR video (including a plurality of image frames), one or more augmented reality (AR) images, or an AR video. In some embodiments, using virtual shopping on the electronic device for an appliance in the physical environment (e.g., a user's kitchen) as an example, the one or more images 402-1 . . . 402-n are one or more photos of the user's kitchen, or a video including multiple image frames showing various items in the kitchen. In some embodiments, the user is located in the physical environment, e.g., the user is at home in his or her kitchen, and holding the electronic device 102 to capture the one or more images of the kitchen using the one or more cameras of the electronic device. In some embodiments, the electronic device 102 has the capability to process the images and generate AR/VR images of the 3-D virtual environment. In some embodiments, the electronic device 102 works cooperatively with the server system 104 to process the images and generate AR/VR images of the 3-D virtual environment. For example, the electronic device 102 captures the images, the upload to the server 104 to process and generate AR/VR images. The generated AR/VR images are then downloaded to the electronic device 102 for display to the user. In some alternative embodiments, the user is at a place remote from the kitchen. For example, the user is at a physical store that sells various kitchen appliances. In one example, the user may take images (e.g., photos or videos) of the kitchen at home before leaving home. In another example, the user may ask someone else at home to take the images of the kitchen, and then the images are uploaded via a link to a server (e.g., the server system 104 with the image processing and rendering modules) to process and generate the VR/AR image 404. The VR/AR image 404 can then be sent to the electronic device 102 at the store for display to the user. As shown in FIG. 4A, the 3-D virtual environment 404 includes one or more representations of physical objects, cabinets 406-1 and 406-2 with respective countertops, a cup 406-4 placed on the countertop, and a wine cabinet 406-3 in the kitchen. Although not shown, the one or more representations of physical objects can also include one or more kitchen appliances, such as stovetop, microwave, etc.

Referring back to FIG. 3A, the method 300 further includes receiving (304) a user input to place a first preset virtual object (e.g., a preset virtual object 412-1) at a space (e.g., the space 408, FIG. 4A) in the 3-D virtual environment 404 corresponding to a space in the physical environment (e.g., the user's kitchen). The method 300 also includes rendering (306), in response to the user input, the first preset virtual object placed in the space in the 3-D virtual environment.

Figure 4B:
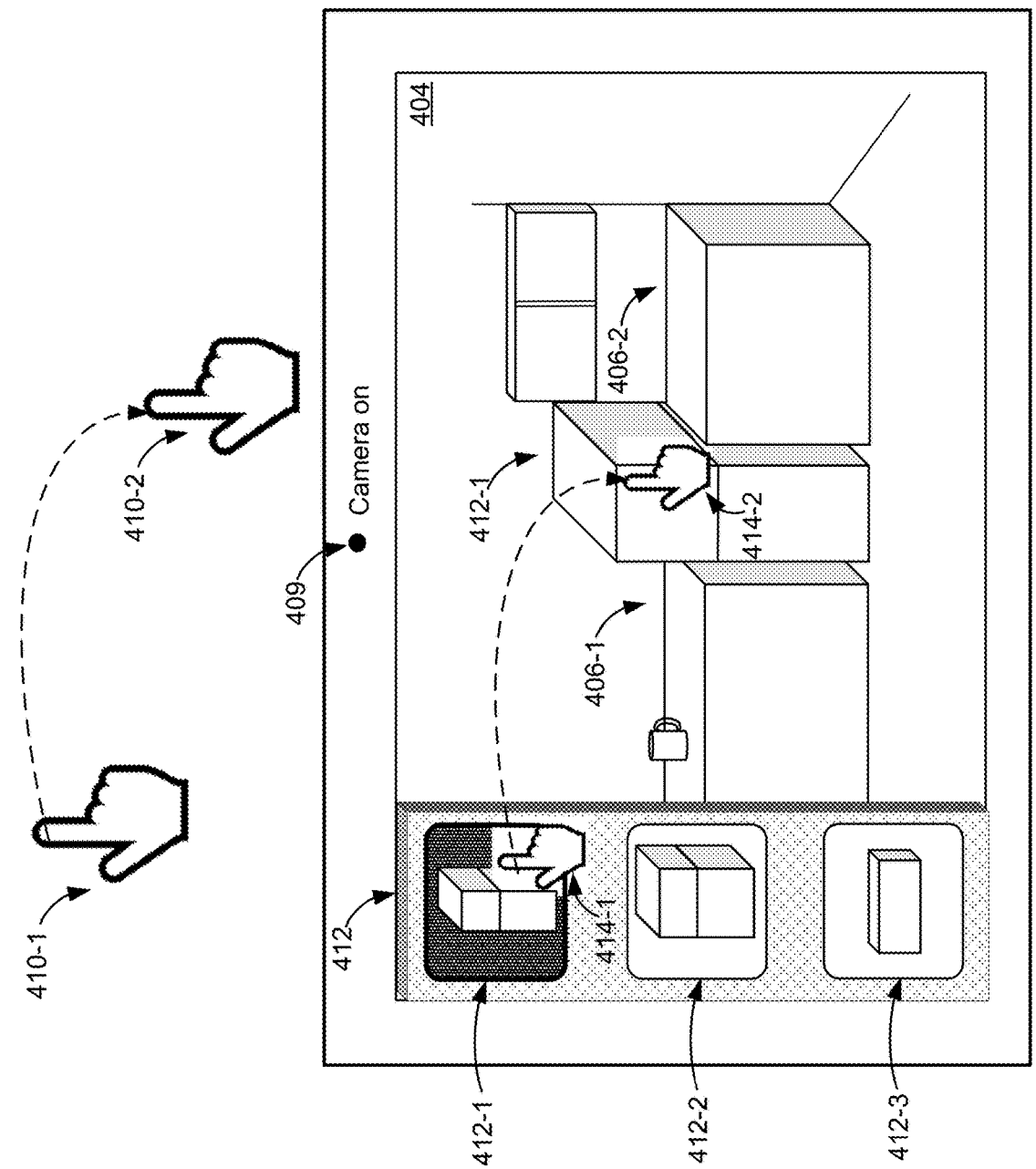

In some embodiments, the user input may be received using an input device of the electronic device 102. For example, the user input is received directly on a touch screen (e.g., a selection from a product catalogue displayed), or on a physical button of the electronic device. In some alternative embodiments, as shown in FIG. 4B, the user input is a hand gesture 410 captured by the one or more cameras 409 (e.g., stereoscopic cameras, depth cameras, a time-of-flight camera (ToF camera), or any other type(s) of imaging sensor capable of measuring depth information) of the electronic device 102. In some embodiments, the hand gesture 410 (e.g., from position 410-1 to position 410-2) is a predetermined hand gesture. Alternatively, the hand gesture 410 indicates a pick and drop action that interacts with a virtual product catalog 410 that is displayed on the user interface. For example, the first preset virtual object 412-1 is selected from the product catalog 410 including a plurality of preset virtual objects (e.g., a 3-D virtual image of a first model of fridge 412-1, a 3-D virtual image of a second model of fridge 412-2, and a 3-D virtual image of an island 412-3). In some embodiments, a representation of the user's hand gesture 414-1 to 414-2 is displayed in real time in the 3-D virtual image 404. For example, as shown in FIG. 4B, in real time as the camera(s) 409 of the electronic device 102 captures the user's hand gesture 410-1 to 410-2, the 3-D virtual environment 404 displays the representation of the user's hand gesture selecting (414-1) the 3-D virtual image of the first model of fridge 412-1 from the virtual catalog 412, and placing (414-2) the virtual fridge 412-1 at the space 408 in the virtual environment 404 between the cabinet 406-1 and the cabinet 406-2, which corresponds to a physical space between the two corresponding cabinets in the kitchen. In some embodiments, the orientation of the virtual fridge 412-1 is also adjusted, either manually or automatically, to align with the space and the representations of the physical objects 406.

Figure 4C:
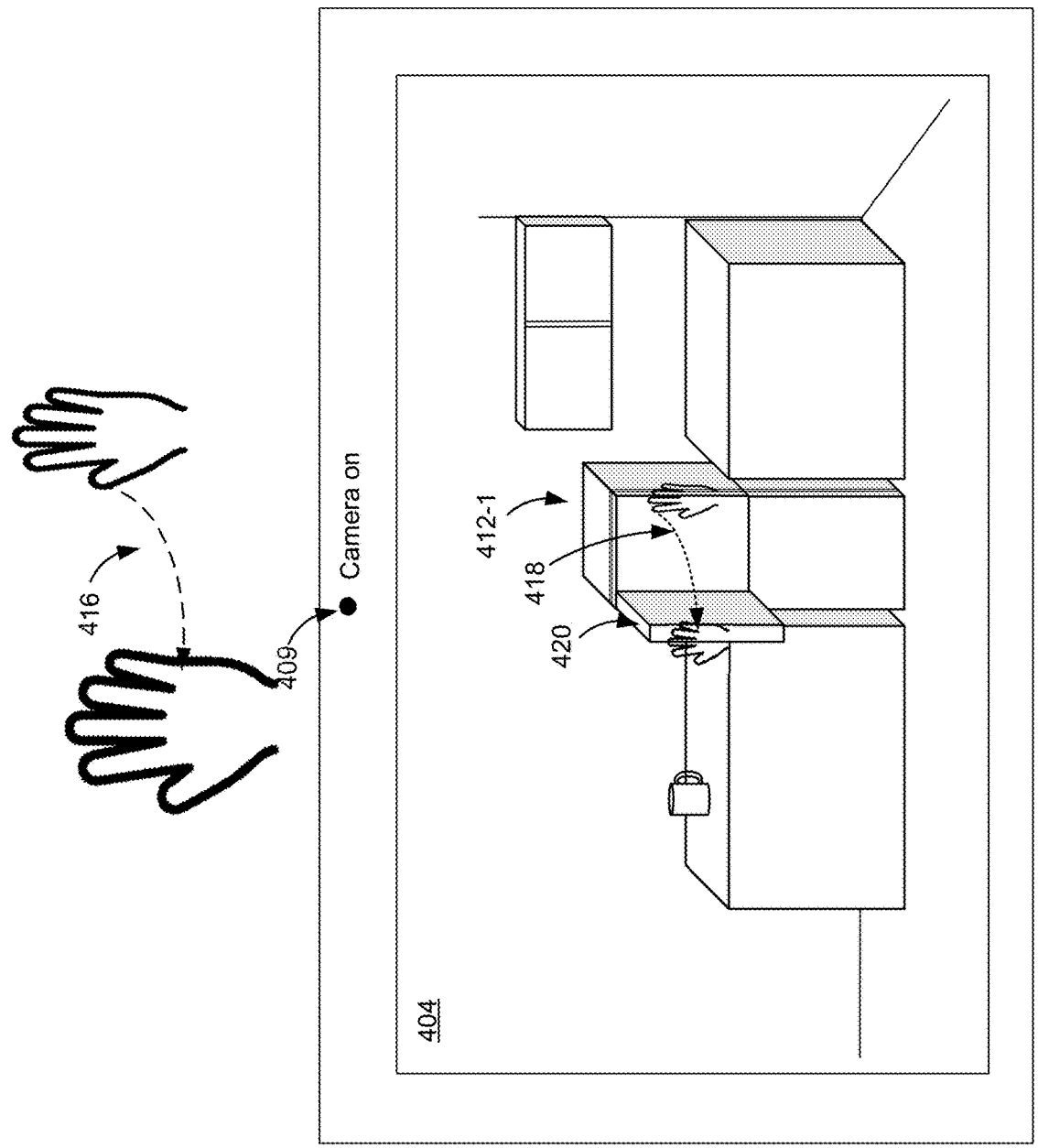

Next, referring back to FIG. 3A, the method 300 includes detecting (308), by the one or more cameras (camera(s) 409, FIGS. 4C-4F), a user's hand gesture (e.g., hand gesture 416, FIG. 4C) interacting with the first preset virtual object (e.g., virtual fridge 412-1, FIG. 4C) in the 3-D virtual environment (e.g., 3-D virtual image 404, FIG. 4C). In some embodiments as shown in FIG. 4C, the user's hand gesture 416 corresponds to a hand movement to open an upper door of the fridge. In response to detecting (310) the user's hand gesture, the method 300 includes translating (312) the user's hand gesture (e.g., hand gesture 416, FIG. 4C) into an interaction (e.g., virtual hand interaction 418 to open an upper door 420 of the virtual fridge, FIG. 4C) with the first preset virtual object (e.g., virtual fridge 412-1, FIG. 4C) in the 3-D virtual environment; identifying (314), in the 3-D virtual environment, a first part (e.g., the upper door 420, FIG. 4C) of the first preset virtual object (e.g., virtual fridge 412-1, FIG. 4C) in the virtual environment (e.g., 3-D virtual image 404, FIG. 4C) that is subject to the interaction (e.g., the virtual hand interaction 418 to open the upper door, FIG. 4C) with the first preset virtual object (e.g., virtual fridge 412-1, FIG. 4C) in the virtual environment (e.g., 3-D virtual image 404, FIG. 4C). The method 300 also includes concurrently displaying (316) in real time on the display: a representation of the user's hand gesture (e.g., the virtual hand interaction 418, FIG. 4C) in the 3-D virtual environment (318); and a movement of the first part of the first preset virtual object (e.g., the virtual upper door 420 of the virtual fridge swings open, FIG. 4C) caused by the interaction 418 with the first preset virtual object 412-1 in the 3-D virtual environment (320).

In some embodiments, the user's hand gesture includes moving a user's hand from a first location to a second location. The cameras 409 capture the hand gesture 416, and the server 104 or the electronic device 102 processes the images to calculate the position change, and contour and size change of the user's hand. In some embodiments, the depth information associated with the hand movement can be determined based on the captured images. Based on the determined depth information, the electronic device 102 renders the 3-D virtual image to show the user's hand appears in front of an object (e.g., representation of the hand 428 placed in front of the representation of the cup 406-4, FIG. 4E) or behind an object (e.g., representation of the hand 432 placed behind the representation of the cup 406-4, FIG. 4F) in the 3-D virtual environment.

Figure 4D:
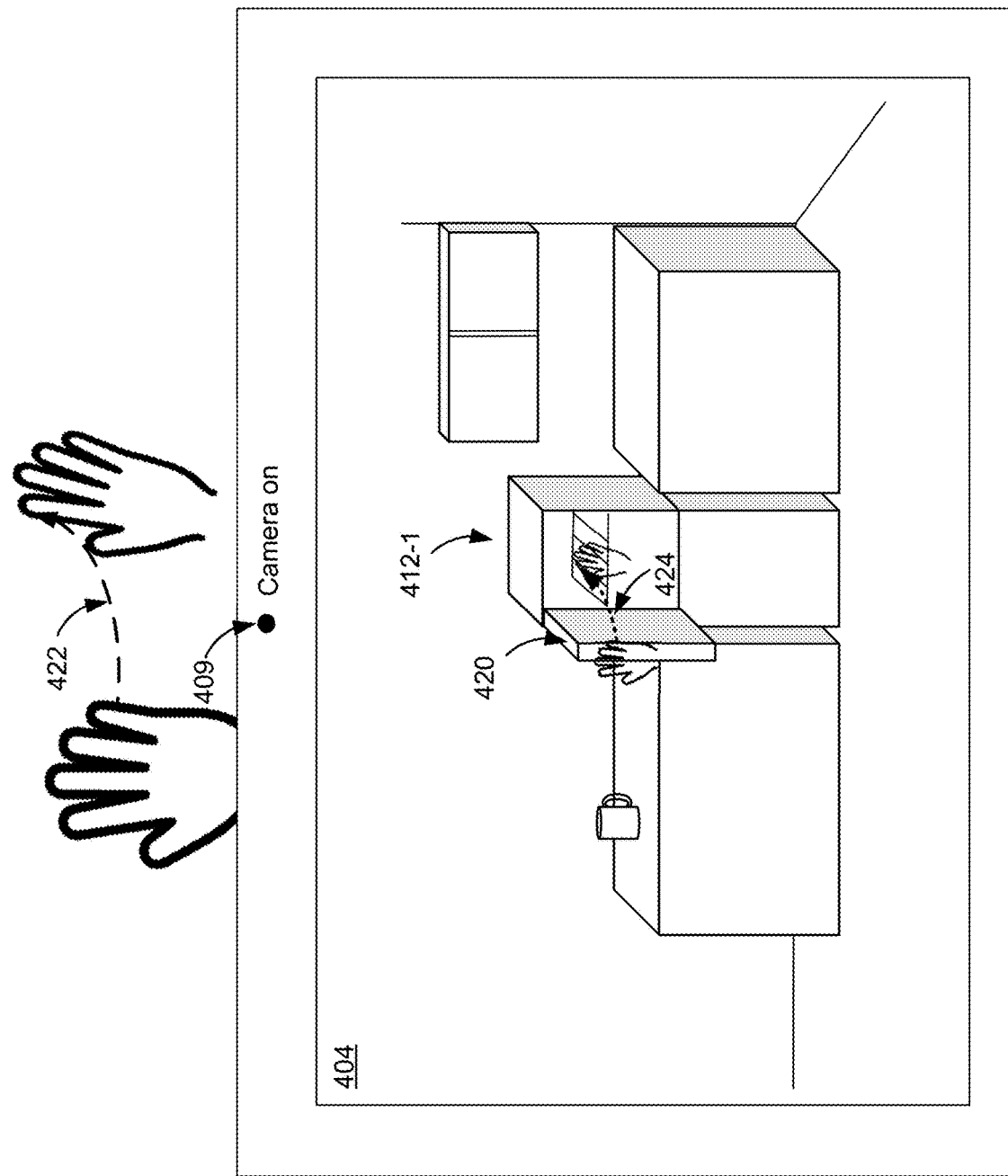
Figure 4F:
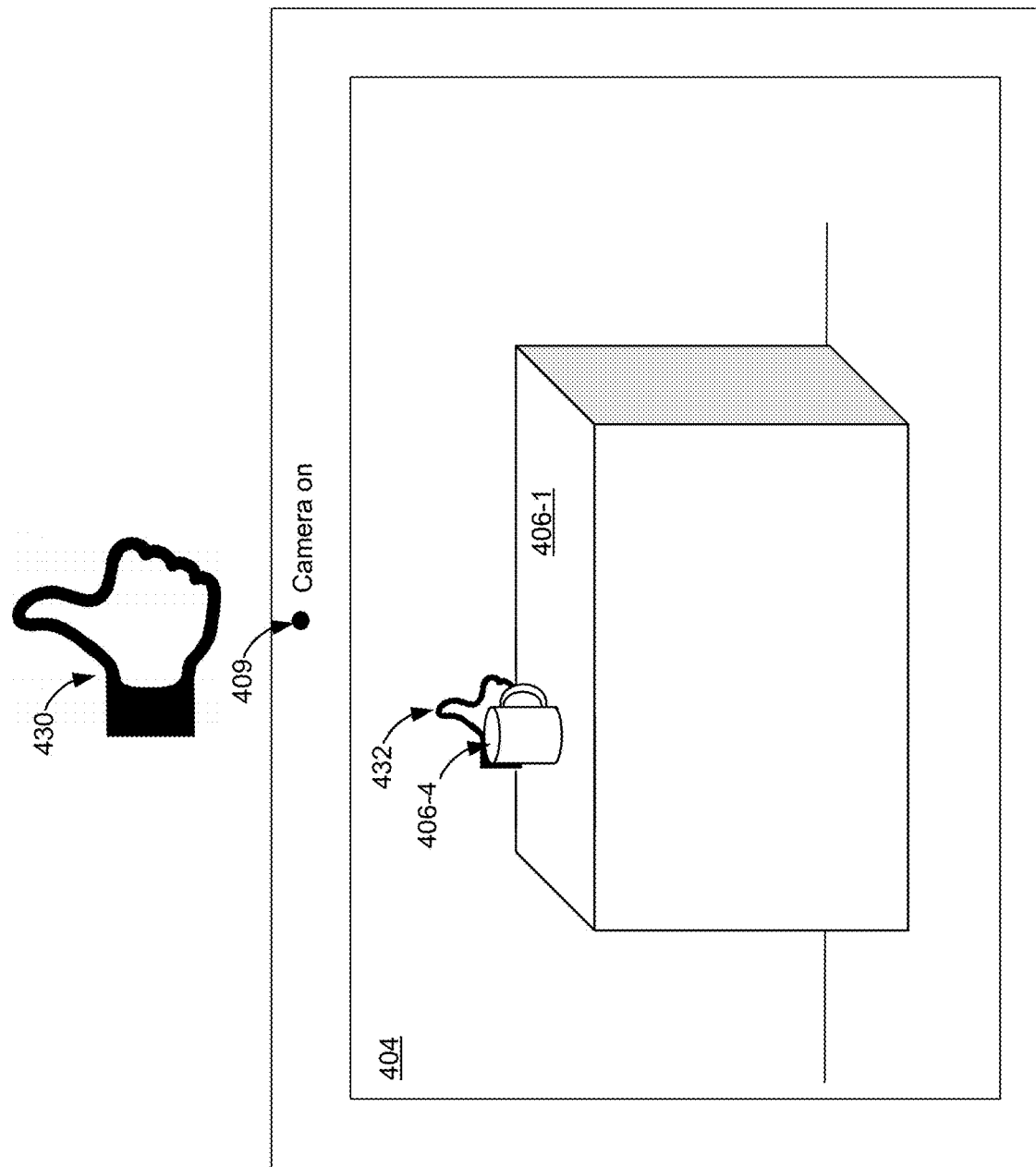

In some embodiments, the user's hand gesture includes an interaction (338, FIG. 3C) between the user's hand and the preset virtual object or a part of the virtual object, such as, opening the door of the virtual fridge, extending a user's hand inside a compartment to see how easy or tight it is to place or retrieve grocery from the compartment of the virtual fridge. For example, as shown in FIGS. 4C-4D, the user's hand gesture includes using his or her hand to interact with a virtual object (e.g., the virtual fridge 412-1) displayed in the 3-D virtual environment. For example, as shown in FIG. 4C, the camera(s) 409 capture the user's hand gesture 416 in the air, and the hand gesture is determined to be opening (418) the upper door 420 of the virtual fridge 412-1. In another example as shown in FIG. 4D, the camera(s) 409 capture that the user's hand gesture 422 which is determined to be extending (424) the user's hand further away from the camera(s) 409 and reaching into the upper compartment of the virtual fridge 412-1. The system can provide a vivid virtual user experience of using the fridge in the user's own kitchen, without having to place the fridge in the kitchen and physically interact with the fridge.

In some embodiments, the user's hand gesture includes using the user's hand to hold and move (e.g., 334, FIG. 3C) the virtual object from a first location (e.g., the space 408, FIG. 4A) to a second location (e.g., the space to the left of the cabinet 406-1, FIG. 4A, or the space to the right of the cabinet 406-2, FIG. 4A) in the virtual kitchen to see the virtual results in the 3-D virtual environment. This is helpful to give the user a direct visual result to evaluate different locations and various orientations to place the fridge in the kitchen without having to place the fridge in the kitchen and then physically move around the fridge to test different locations.

In some embodiments, the user may fit in different types of virtual products into the space 408 using user's hand gesture, such as swapping (e.g., 336, FIG. 3C) the preset virtual fridge 412-1 with a different virtual object, e.g., the virtual fridge 412-2 in different color and/or size, in the same space 408 (FIG. 4A). The user may also use hand gestures to swap the virtual fridge 412-1 with a different type of virtual product, such as a virtual stovetop, to see the fitting results.

In some embodiments, the user's hand gesture includes activating (e.g., 340, FIG. 3C) a function of a product corresponding to the preset virtual object. For example, in response to the user's hand gesture, the electronic device renders that the representation of the user's hand turns a knob or presses a button on the virtual product, which triggers the virtual product to perform a corresponding function in the virtual environment, such as pre-heating an oven. In some embodiments, the user may use hand gestures to swap a part of a representation of a physical object, with a virtual part that can replace the part of the physical object, such as a compartment of a fridge, a display panel of a stove top. This virtual function testing and/or virtual part swapping can provide the user direct visual effects for product design, such as panel button designs, handle designs, etc. before building a real product or a product demo. As a result, the user does not have to build multiple product demos with different knob shapes, colors, and sizes, thus saving time, material and labor cost with improved user experience.

In some embodiments, user's hand gesture is translated (312) into an interaction with the preset virtual object based on real-time image processing (e.g., performed by the image processing module 220 and/or 275, FIGS. 2A-2B). In some embodiments, before processing real-time user interactions with the virtual object using hand gestures, the electronic device 102 (or the electronic device 102 cooperatively with the server system 104) performs a calibration process which is also customized to an individual user. For example, the user's hand is marked with markers or the user wears a glove with markers that are used to mark a plurality of characteristic points of the user's hand to be captured by the one or more camera(s) 409. In some embodiments, the characteristic points are used to define a contour of the user's hand. Various parameters of the hand contour, such as area, perimeter, centroid, bounding box, and/or other suitable parameters can be analyzed to understand the user's hand gestures. In some embodiments, the change of the contour shape of the user's hand can be analyzed to determine the action to the virtual object, e.g., opening a door or opening a lid of a virtual object (e.g., a rice cooker, or a fridge). In some embodiments, the position change of the user's hand detected is used to determine a moving path (e.g., including distance and displacement between a first position and a second position) of the user's hand. In some embodiments, the size change of the user's hand, in combination with other types of data (e.g., camera data (such as depth related information), hand shape change, and/or hand position change) can be used to determine depth data related to the movement of the user's hand. In some embodiments, the depth data may be obtained based on camera data and/or dimension and position change of the hand. For example, whether the user's hand is in front of an object (e.g., a virtual object or a representation of a physical object in the 3-D virtual image) in the 3-D virtual environment 404 (e.g., hand 426 and corresponding representation of the hand 428 placed in front of the representation of the cup 406-4, FIG. 4E), behind (e.g., hand 430 and corresponding representation of the hand 432 placed behind the representation of the cup 406-4, FIG. 4F), or inside a virtual object or a representation of the a physical object, can be determined by comparing the depth data of the user's hand and the depth data of the virtual object or the representation of the a physical object in the 3-D virtual environment.

In some embodiments, during the calibration process, the user may be instructed to perform a set of predetermined hand gestures in a predetermined distance range from the camera(s), such as holding a fist, gripping a ball, pulling a handle, opening a door, etc. Relationships between the predetermined hand gestures and respective sets of data associated with the user's hand actions that are captured by the one or more cameras are established and stored. For example, a set of data associated with a predetermined hand gesture may include, position data, contour area data, contour shape factors, and depth data of the user's hand when performing the predetermined hand gesture. In some embodiments, such data, alone or in combination with other hand gesture data, may further be used to build machine learning models to analyze and determine user's various hand gestures (e.g., hand gesture models 232 or 281, FIGS. 2A-2B).

In some embodiments, after the calibration process, when the user uses the electronic device to virtually experience an interaction with a virtual product (e.g., a virtual shopping or virtual product design and testing experience), the one or more cameras of the electronic device capture user's hand gesture in real time. The contour defined by the markers on the user's hand are analyzed in real time to perform image segmentation. Then, based on the user hand gesture data obtained from the calibration process, the real-time user's hand interactions with the virtual object can be determined.

In some embodiments, the representation of the user's hand gesture and the movement of the preset virtual object or a part of the preset virtual object caused by the interaction are concurrently displayed in real time on the display of the electronic device. In some embodiments, the recognized hand and the preset virtual product are integrated to render an updated 3-D virtual image of user's hand interaction with the virtual product, such as user opening the fridge door (e.g., FIG. 4C), user extending the hand into the fridge to put fruits in a compartment (e.g., FIG. 4D). In some embodiments, the user's hand gesture is analyzed based solely on real-time image processing. For example, the depth information, dimensional change, location change, and size change of the hand are analyzed based on image data and camera data. No other sensors are used.

Figure 3B:
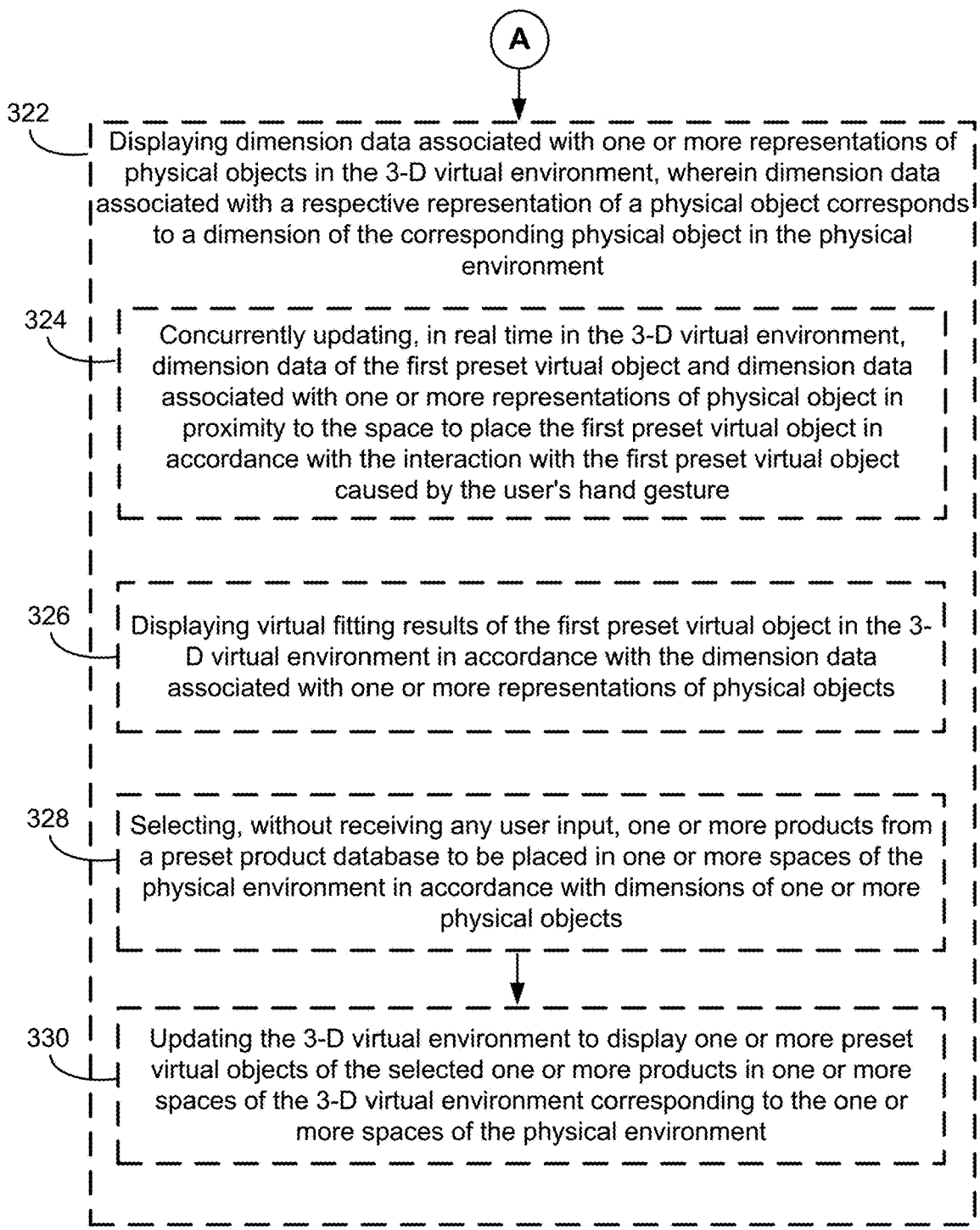
Figure 3C:
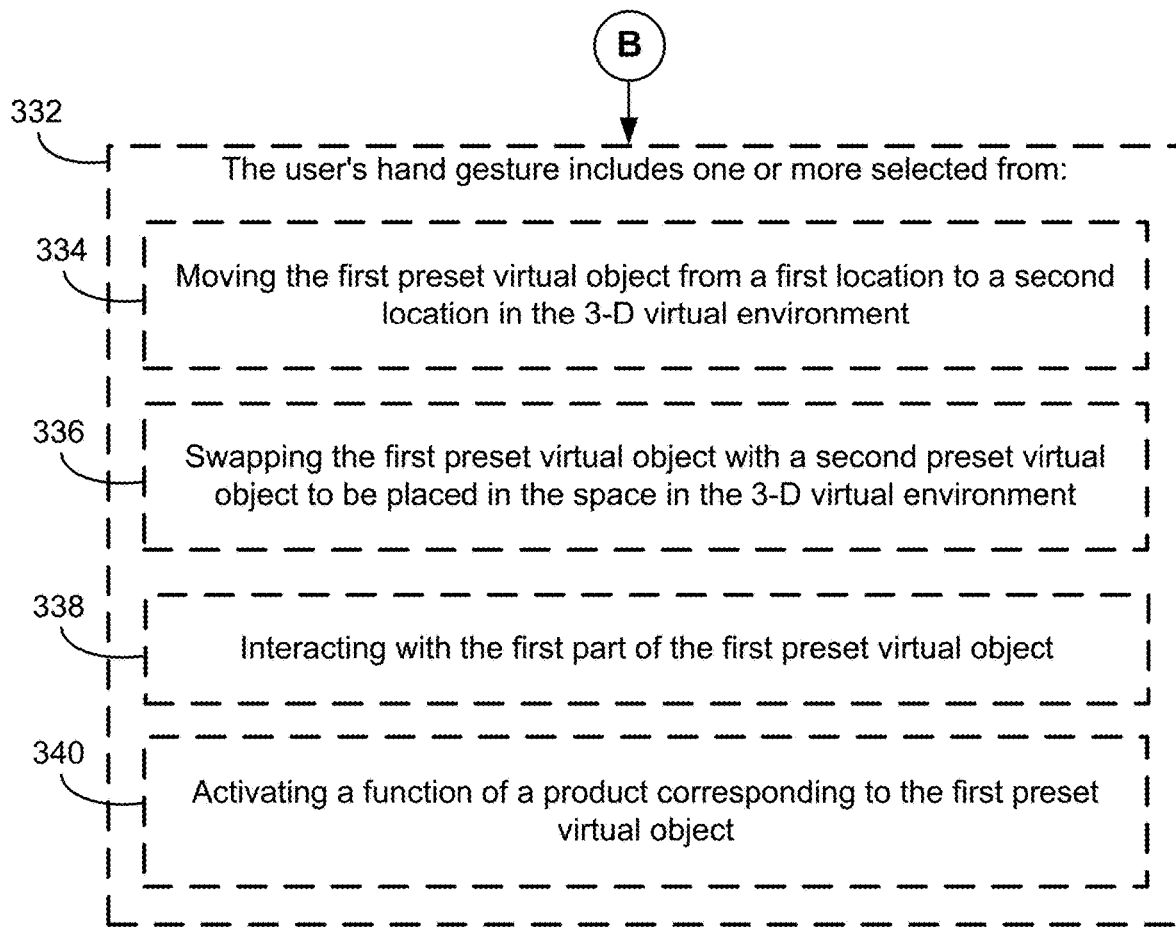
Figure 3D:
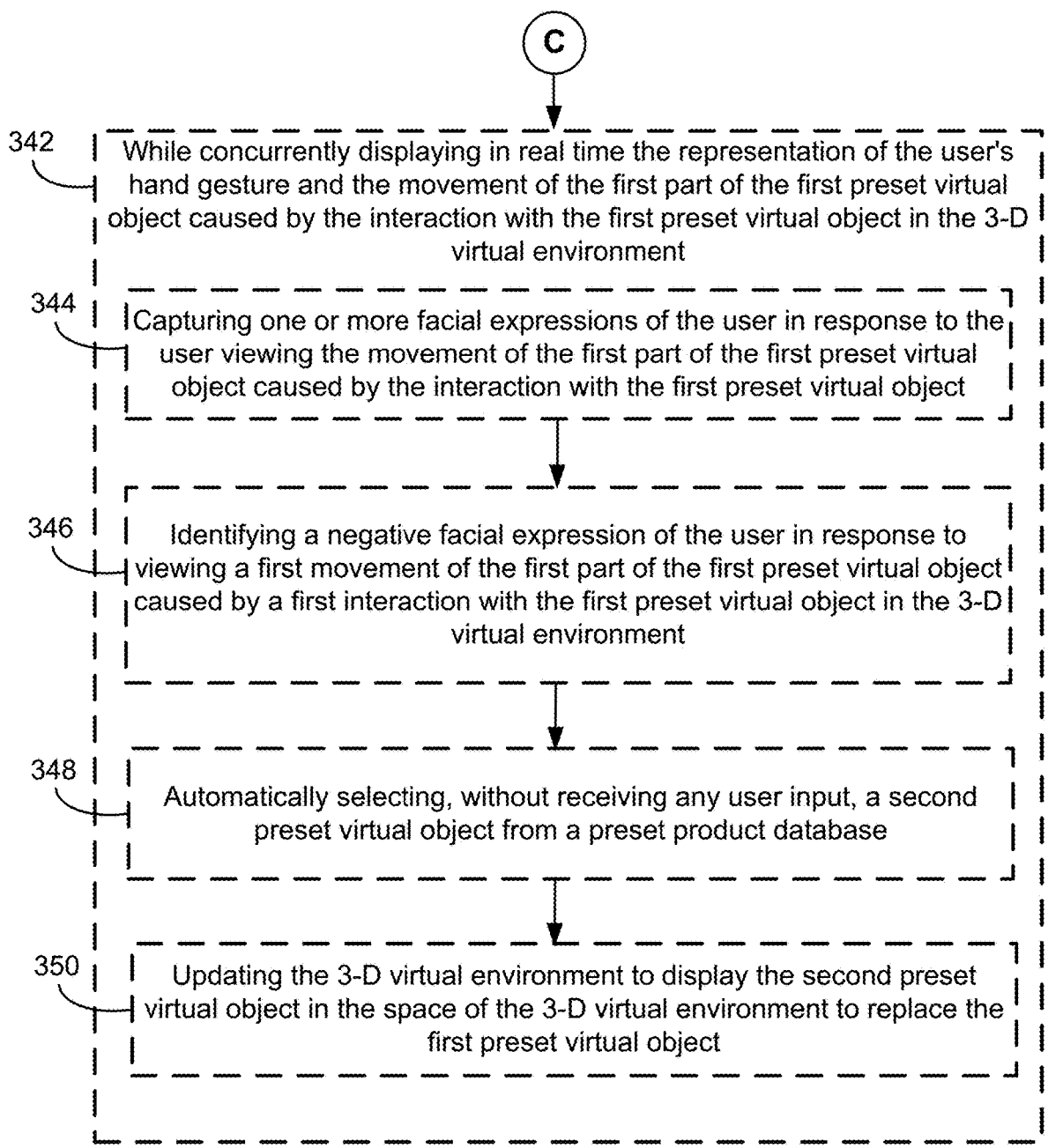
Figure 4G:
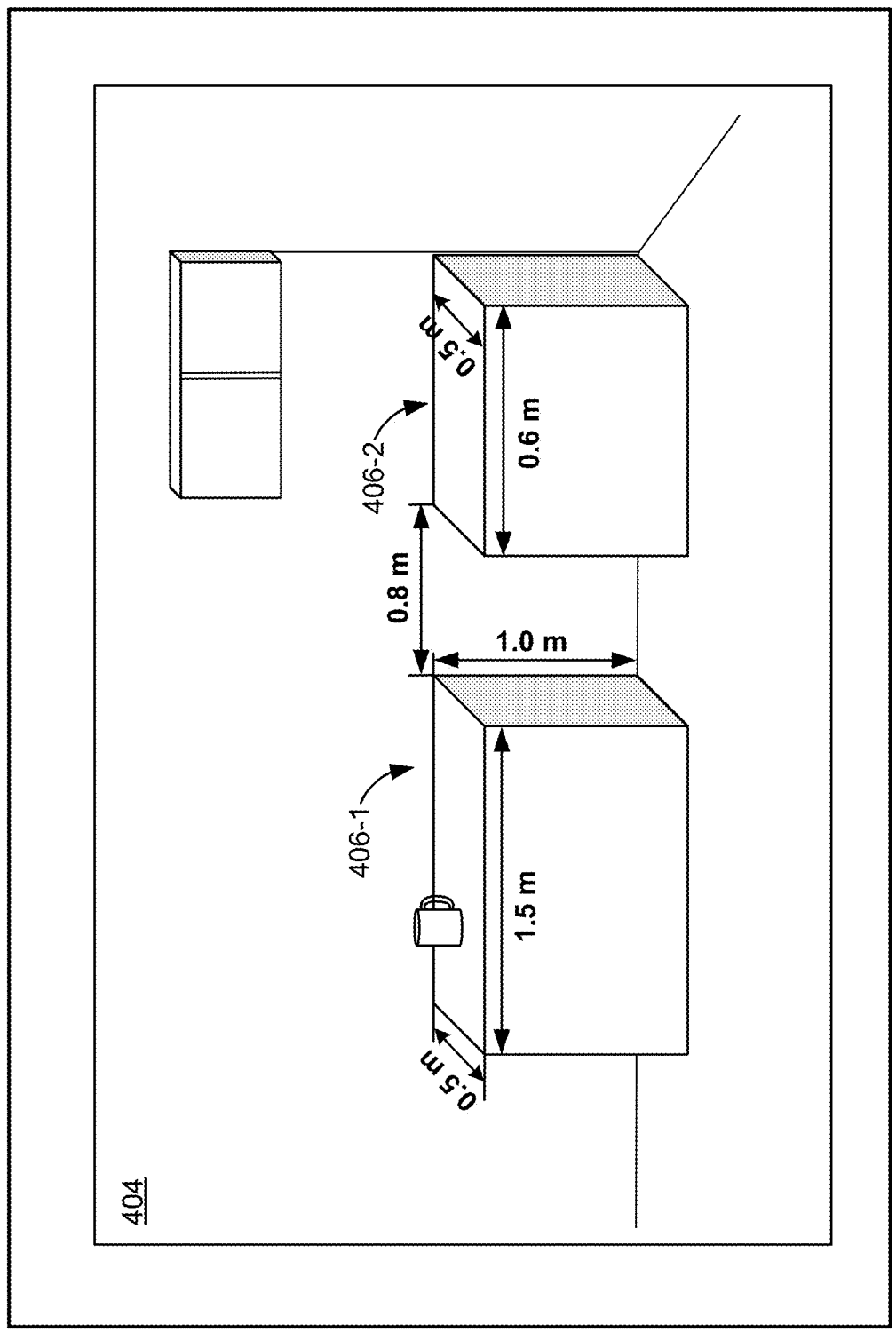

Referring to FIG. 3B, the method 300 further includes displaying (322) dimension data (e.g., FIG. 4G) associated with one or more representations of physical objects (e.g., representations of cabinets 406-1 and 406-2, FIG. 4G) in the 3-D virtual environment 404. In some embodiments, dimension data associated with a respective representation of a physical object corresponds to a dimension of the corresponding physical object in the physical environment. In some embodiments, the dimension data is obtained based on the image information and/or the camera data associated with the one or more cameras capturing the one or more images. In some embodiments, the dimension data is obtained from one or more cameras that took the one or more images (e.g., meta data of the images, including length, width, and depth). In some embodiments, the cameras can be the cameras of the electronic device 102 (e.g., when the user is at home in the kitchen), or cameras of another device located remotely from the user, e.g., when the user is at the store and another person takes the photos of the kitchen. In some embodiments, the person who takes the images of the kitchen can use an application which provides measuring tools to measure dimension (e.g., length, width, and depth) of the physical environment. For example, the application may display a scale in the image that is translated into real sizes in the physical environment. In another example, the application can recognize a physical object (e.g., an existing product) in the kitchen with known dimensions as a reference (e.g., by retrieving product specifications from the database), and compare one or more representations of the physical objects in the image with the known dimensions (e.g., by pixel numbers) to determine the dimension of other physical objects. In some embodiments as shown in FIG. 4G, the dimension data can be displayed while rendering (302) the 3-D virtual environment based on the images of the physical environment.

Figure 4H:
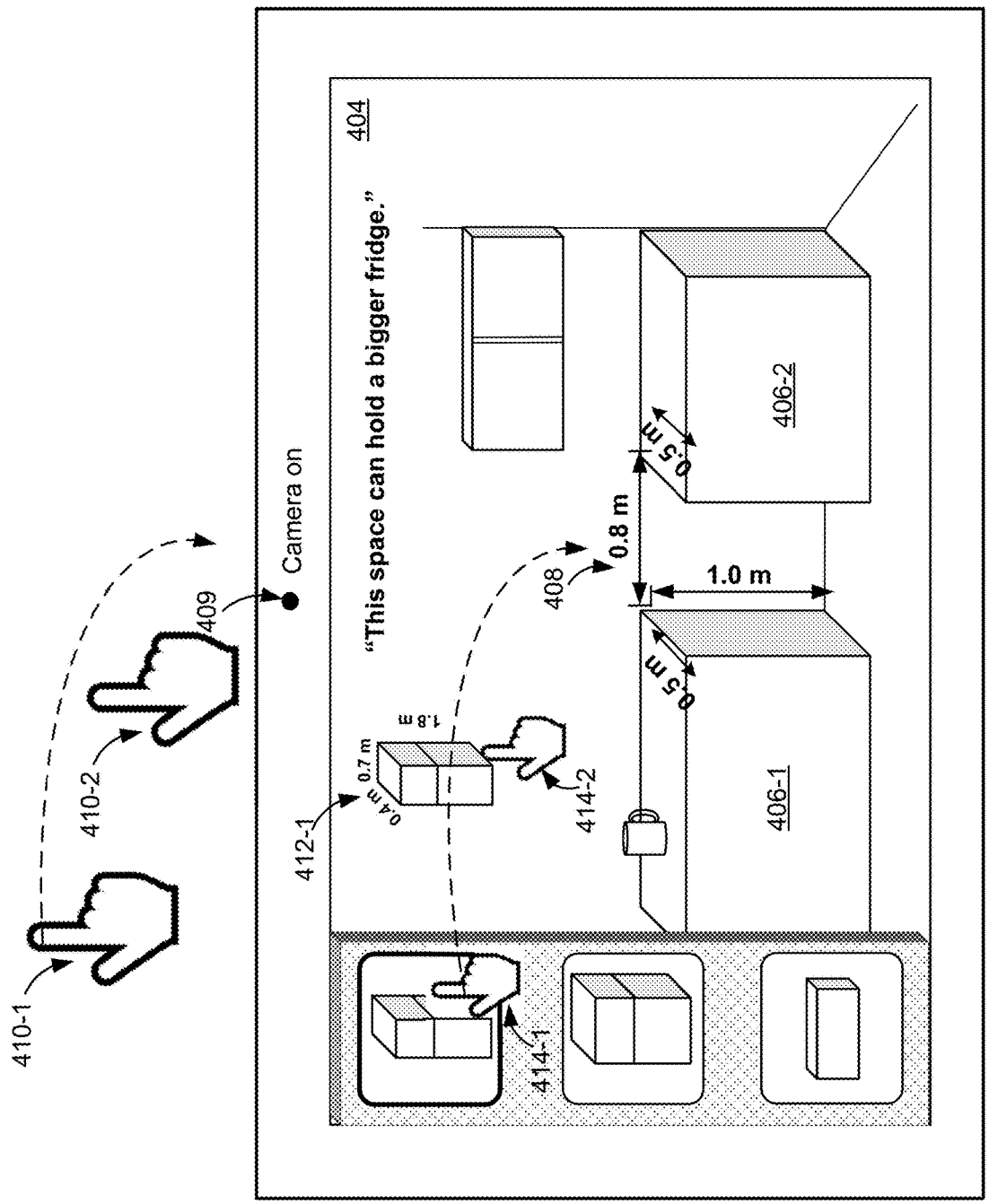

In some embodiments, the method 300 further includes concurrently updating (324), in real time in the 3-D virtual environment, dimension data of the first preset virtual object (e.g., the virtual fridge 412-1, FIG. 4H) and dimension data associated with one or more representations of physical objects (e.g., the representation of cabinets 406-1 and 406-2) in proximity to the space (e.g., the space 408, FIG. 4H) to place the first preset virtual object in accordance with the interaction with the first preset virtual object caused by the user's hand gesture (e.g., the representation 414-1 to 414-2 of the user's hand gesture 410-1 to 410-2). In some embodiments, as shown in FIG. 4H, only the relevant dimensions of relevant physical objects are displayed, instead of displaying all dimensions for all objects. For example, a user is fitting a virtual fridge between two countertops, the distance between the adjacent edges of the countertops is displayed, and the adjacent object heights may be shown. However, the length of the countertop is not necessary to be shown.

In some embodiments, the electronic device also concurrently displays dimension illustrations of a virtual object or a representation of a physical object changing simultaneously with the user interaction with the virtual object. For example, when the user's hand gesture changes an orientation of the virtual object to fit in the space, a different surface or edge of the virtual object may be revealed, and the corresponding dimension data of the revealed surface or edge are displayed. In some embodiments, the dimension data is displayed when the user's hand gesture picks up a virtual object from the virtual catalog, or when the user's hand gesture drags the virtual object towards the space 408 and gets close enough to the space. In some embodiments, the electronic device can scan the area in the 3-D virtual environment to generate or highlight one or more surfaces or spaces marked with relevant dimensions for placing the virtual product. In some embodiments, the measuring module 228 or 279 (FIGS. 2A-2B) can calculate measurements based on distance (or pixel numbers) in the images.

Figure 4I:
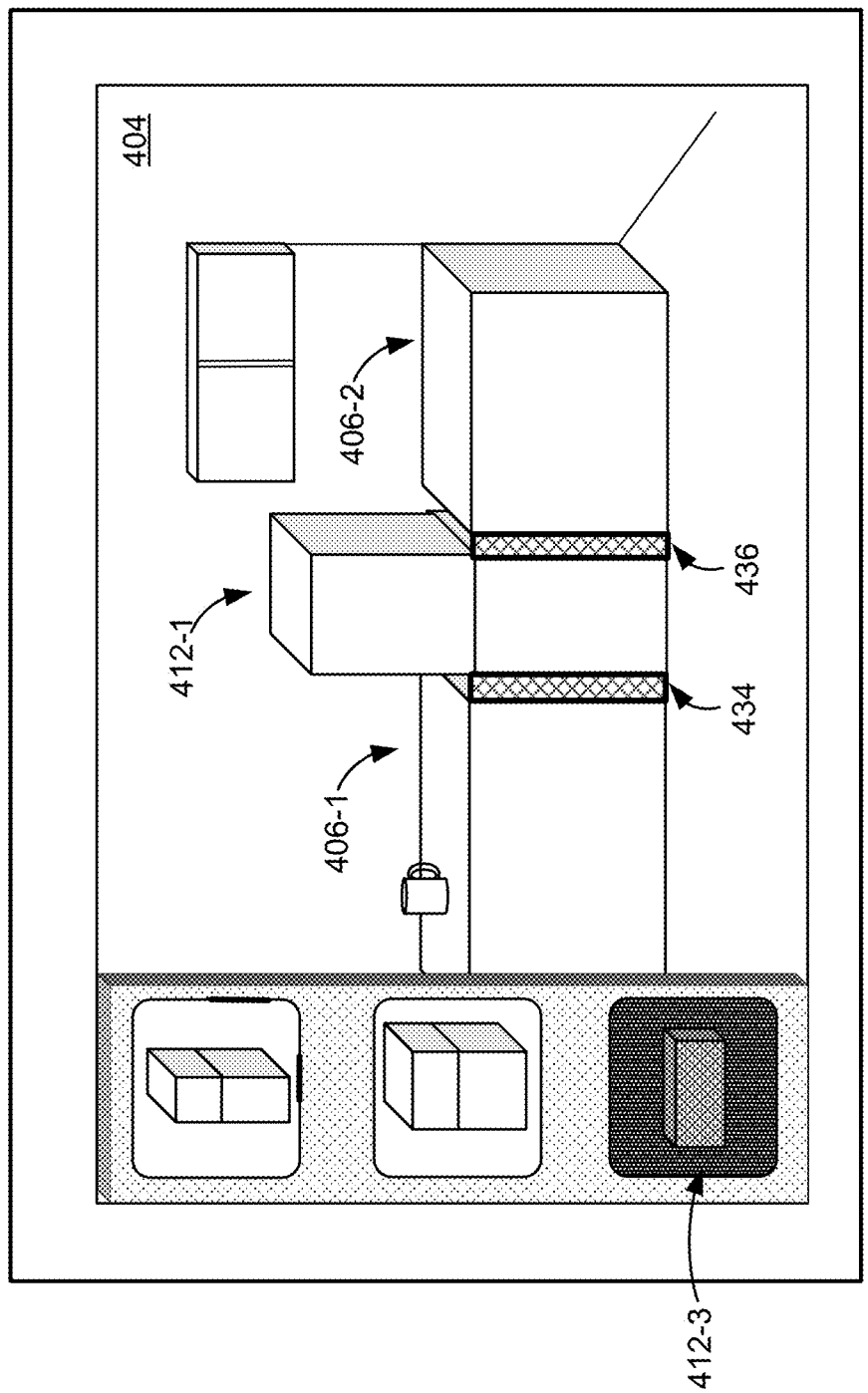

In some embodiments, the method 300 further includes displaying (326) virtual fitting results of the first preset virtual object in the 3-D virtual environment in accordance with the dimension data associated with one or more representations of physical objects. As shown in FIG. 4I, when the virtual fridge 412-1 is narrower than the width of the space 408 between the representations of the cabinets 406-1 and 406-2, virtual gaps 434 and 436 between the virtual fridge and respective cabinets are highlighted (e.g., colored, or bolded) to notify the user of such mismatches. In some embodiments, the virtual fitting results are displayed when the preset virtual object is rendered (306) in response to the user input. In some embodiments, the virtual fitting results are displayed when the preset virtual object is rendered (316) in response to one or more user hand gestures (e.g., when fitting the virtual object in multiple spaces in the kitchen, or fitting multiple different virtual objects in a particular space in the kitchen). In some embodiments, when the user chooses one or more appliances from the virtual product catalog to fit into a particular space, the user can drag the virtual product to close to or far away from the particular space, and the visual virtual fitting results can be displayed as the virtual product is in proximity to the particular space. In some embodiments, when the particular space cannot fit one or more virtual product from the catalog (e.g., the virtual product being too wide for the space), such unfit virtual product(s) on the virtual product catalog will be shown as ineligible for placing into this space (e.g., in gray shade on the screen, 412-3 in FIG. 4I).

In some embodiments as shown in FIG. 3B, the method 300 further includes selecting (328), without receiving any user input, one or more products from a preset product database to be placed in one or more spaces of the physical environment in accordance with dimensions of the one or more physical objects and the physical environment. In some embodiments, the electronic device 102, working alone or cooperatively with the server system 104, can automatically recommend products to the user based on the dimension data of the user's kitchen and the one or more existing appliances and furniture in the kitchen. In some embodiments, the recommendation module 226 or 278 (FIGS. 2A-2B) selects products for recommendation based on dimensions, colors, and/or styles of the existing physical objects (e.g., adjacent cabinets) in the physical environment (e.g., kitchen), and dimensions of the one or more products (e.g., fridges), color matching, style matching, theme matching, user interactions (such as detecting which space does the user want to place a product in the kitchen, and in what orientation does the user want to place the product). In some embodiments, the recommendation module (FIGS. 2A-2B) may also refer to user's history purchase data, customized preference data, budget, and/or other suitable user data.

Figure 4J:
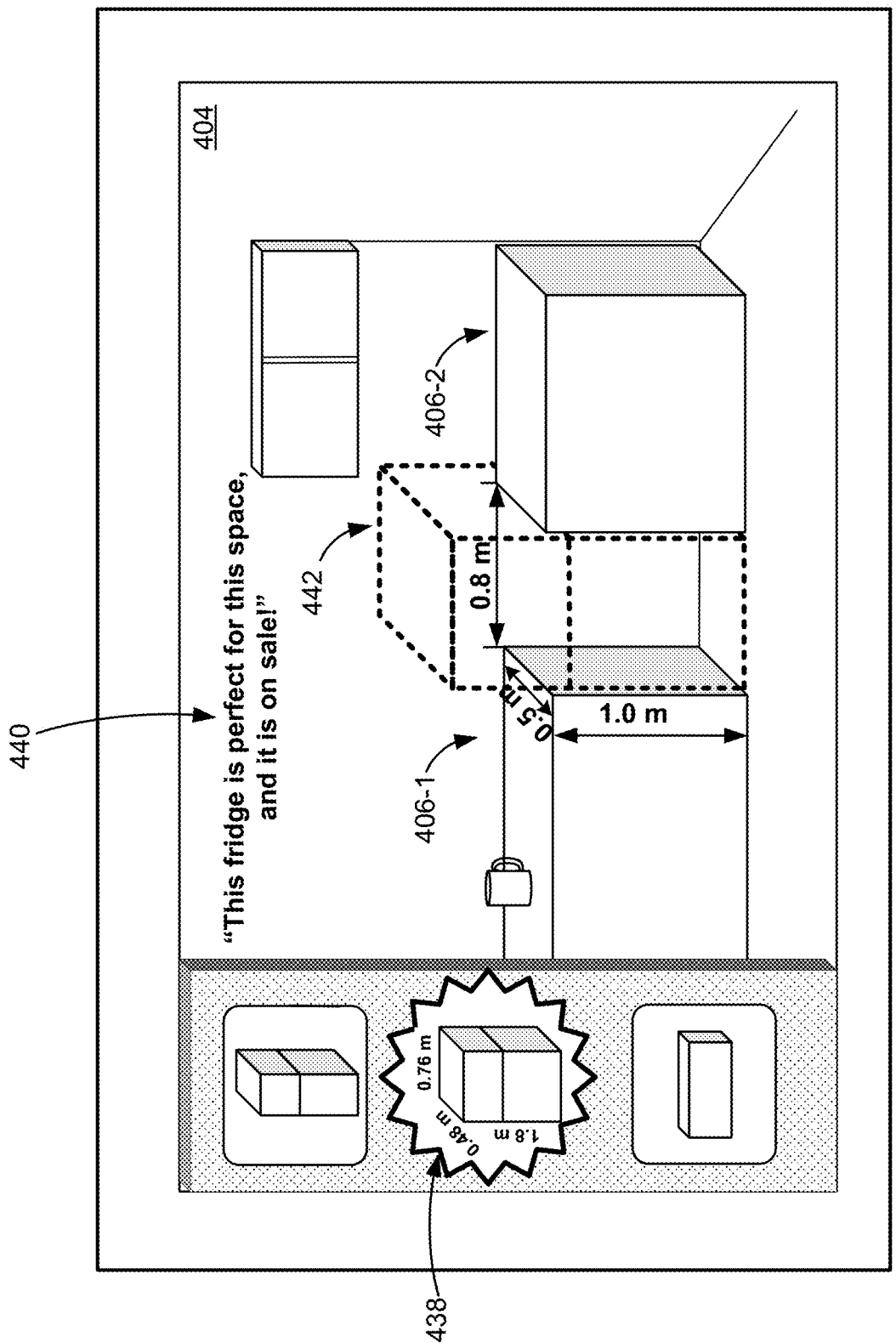

The method 300 also includes updating (330) the 3-D virtual environment to display one or more preset virtual objects of the selected one or more products (for recommendation) in one or more spaces of the 3-D virtual environment corresponding to the one or more spaces of the physical environment. As shown in FIG. 4J, in some embodiments, the electronic device 102 can render the 3-D virtual environment to show the visual results 442 (e.g., a virtual fridge placed between the cabinets) of fitting the recommended products (e.g., the virtual fridge 438) in the user's kitchen and matching the recommended products with other items (e.g., the representations of the cabinets 406-1 and 406-2) in the kitchen in 3-D virtual views. The electronic device may further display a comment 440 "This fridge is perfect for this space, and it is on sale" to promote the recommended product. In some embodiments, the related dimensions, e.g., the dimensions of the recommended virtual product 438 and the dimensions of the space 408 to fit the virtual product, are also displayed in the 3-D virtual view 404. In some embodiments, the measuring module (e.g., FIGS. 2A-2B) scans the kitchen area to get the dimensions, and these dimensions of the kitchen are automatically compared with product database to show the appropriate products (e.g., appliances and/or furniture) that can fit and match in the kitchen space. In some embodiments, the measuring module and the recommendation module (FIGS. 2A-2B) further scans the kitchen area to generate one or more surfaces (e.g., creating an island in the middle of the kitchen with a sink and/or a stovetop on the island, adding a cabinet with a countertop to place a microwave) for placing products. In some embodiments, the measuring module (e.g., FIGS. 2A-2B) can calculate measurements based on depth related camera data (e.g., focal length, depth data) from the camera(s) taking the kitchen images and/or depth related image data (e.g., number of pixels) in the images. In some embodiments, Referring to FIG. 3D, in some embodiments, the method 300 also includes while concurrently displaying (342) in real time the representation of the user's hand gesture and the movement of the first part of the first preset virtual object caused by the interaction with the first preset virtual object in the 3-D virtual environment: capturing (344) one or more facial expressions of the user in response to the user viewing the movement of the first part of the first preset virtual object caused by the interaction with the first preset virtual object. In some embodiments, the facial expression (e.g., facial expression 444, FIG. 4K) can also be the user viewing a fitting result of placing a virtual product in a space using a user input or a user gesture (e.g., FIG. 4B), or interacting with a part of a virtual product using a user gesture (e.g., FIGS. 4C-4D and 4I-4J). The method 300 further includes identifying (346) a negative facial expression (e.g., an unhappy, upset, sad, or disgusted face) of the user in response to viewing a first movement of the first part of the first preset virtual object caused by a first interaction with the first preset virtual object in the 3-D virtual environment. The method 300 also includes automatically selecting (348), without receiving any user input, a second preset virtual object from a preset product database; and updating (350) the 3-D virtual environment to display the second preset virtual object in the space of the 3-D virtual environment to replace the first preset virtual object. In some embodiments, the second preset virtual product is displayed in the 3-D virtual environment 404 in response to user's confirmation, or automatically without any user input.

Figure 4K:
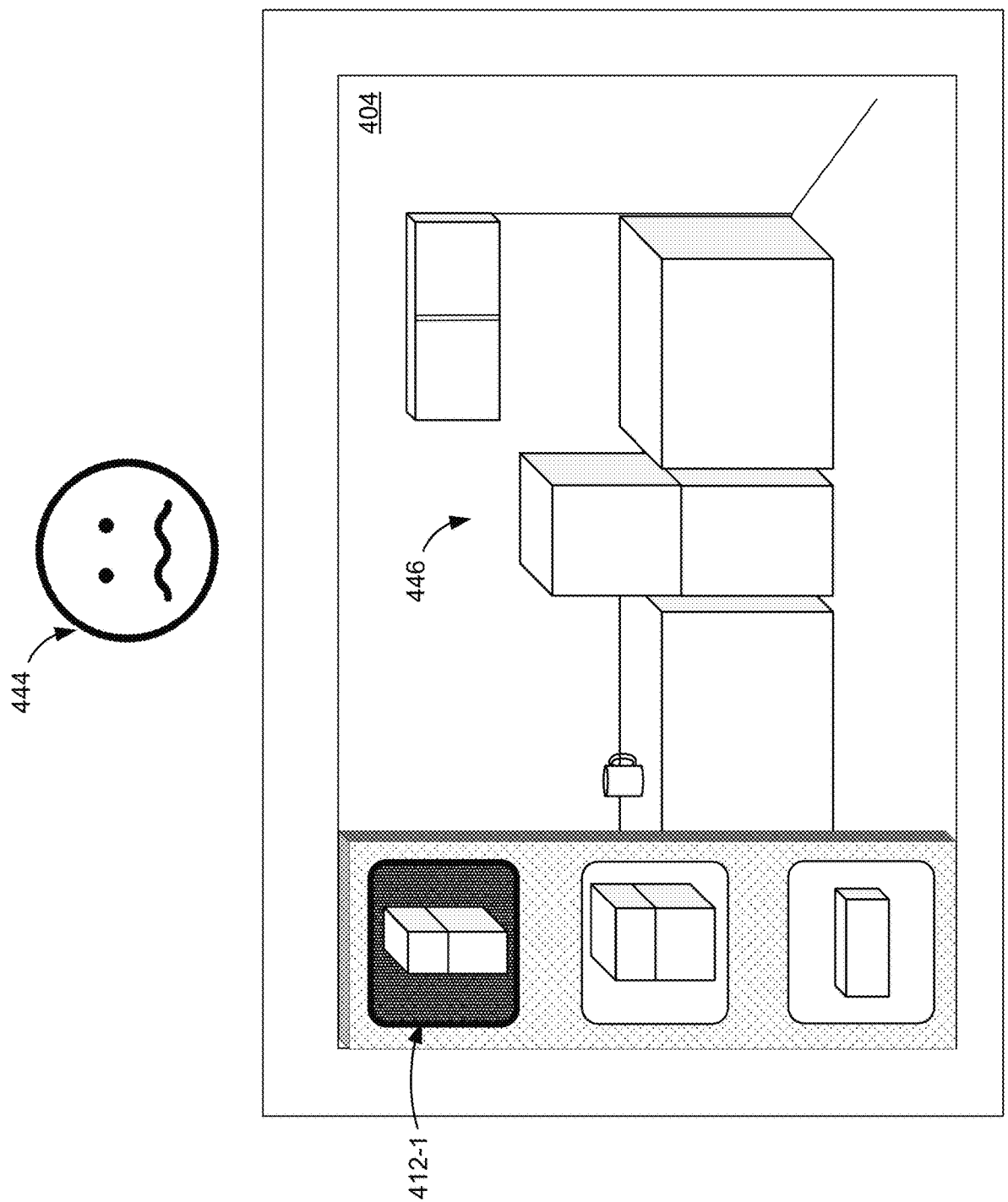
Figure 4L:
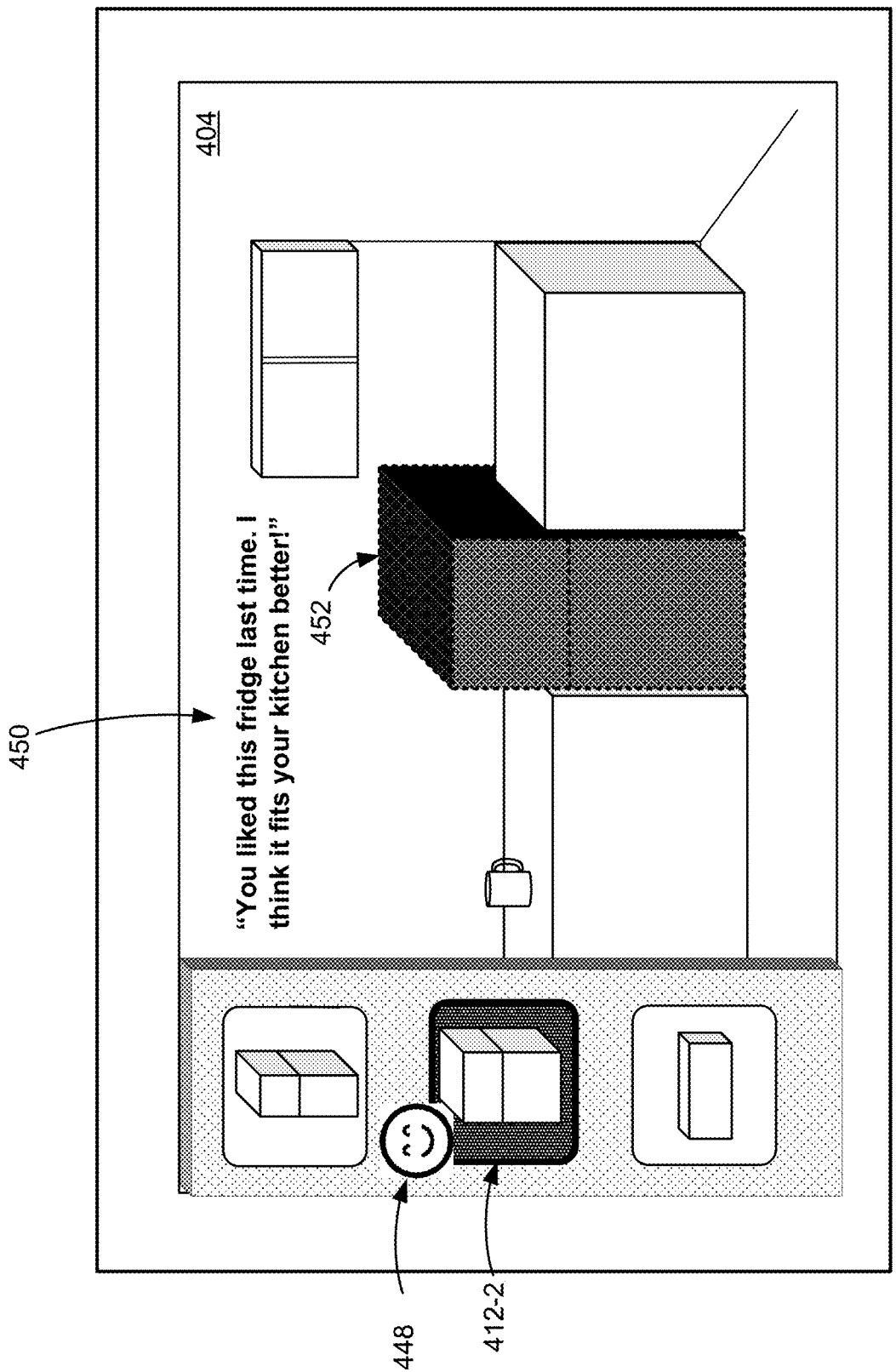

In some embodiments, the facial expressions of the user are captured by pointing the cameras 409 of the electronic device 102 towards the user's face. In some other embodiments, the facial expressions are captured by one or more cameras of another device. The facial expression data is stored in a preset database 234 or 282 (e.g., FIGS. 2A-2B), and the database is either customized to the individual user or to store facial expression data from multiple users. Machine learning algorithms can be used to establish facial expression models related to relationships between user's facial expressions and user's reactions/preferences (e.g., like, dislike, okay, no reaction, delighted, excited, sad, disgusted, etc.) to various products. In some embodiments as shown in FIG. 4K, a user's unsatisfied face 444 is captured when the user is viewing a virtual product 412-1 being placed (446) in the 3-D virtual environment 404. The electronic device 102, alone or cooperatively with the server system 104, can recognize that the user does not like this product. In response to detecting the user's negative feedback, as shown in FIG. 4L, the recommendation module (FIGS. 2A-2B) recommends another virtual product (e.g., a virtual fridge 412-2 in a different model) based on user's previous feedbacks on other products (e.g., the feedbacks reflected by a positive facial expression 448 associated with the virtual product 412-2, FIG. 4L). This virtual product may also be recommended because its dimensions (and/or color, style) fit better in the particular space in the kitchen. In some embodiments, the virtual fitting result 452 is rendered to provide the user a direct visual experience. In some embodiments, the electronic device 102 further displays a comment 450 (e.g., "you liked this fridge last time, I think it fits your kitchen better") to provide suggestions to the user.

Figure 5:
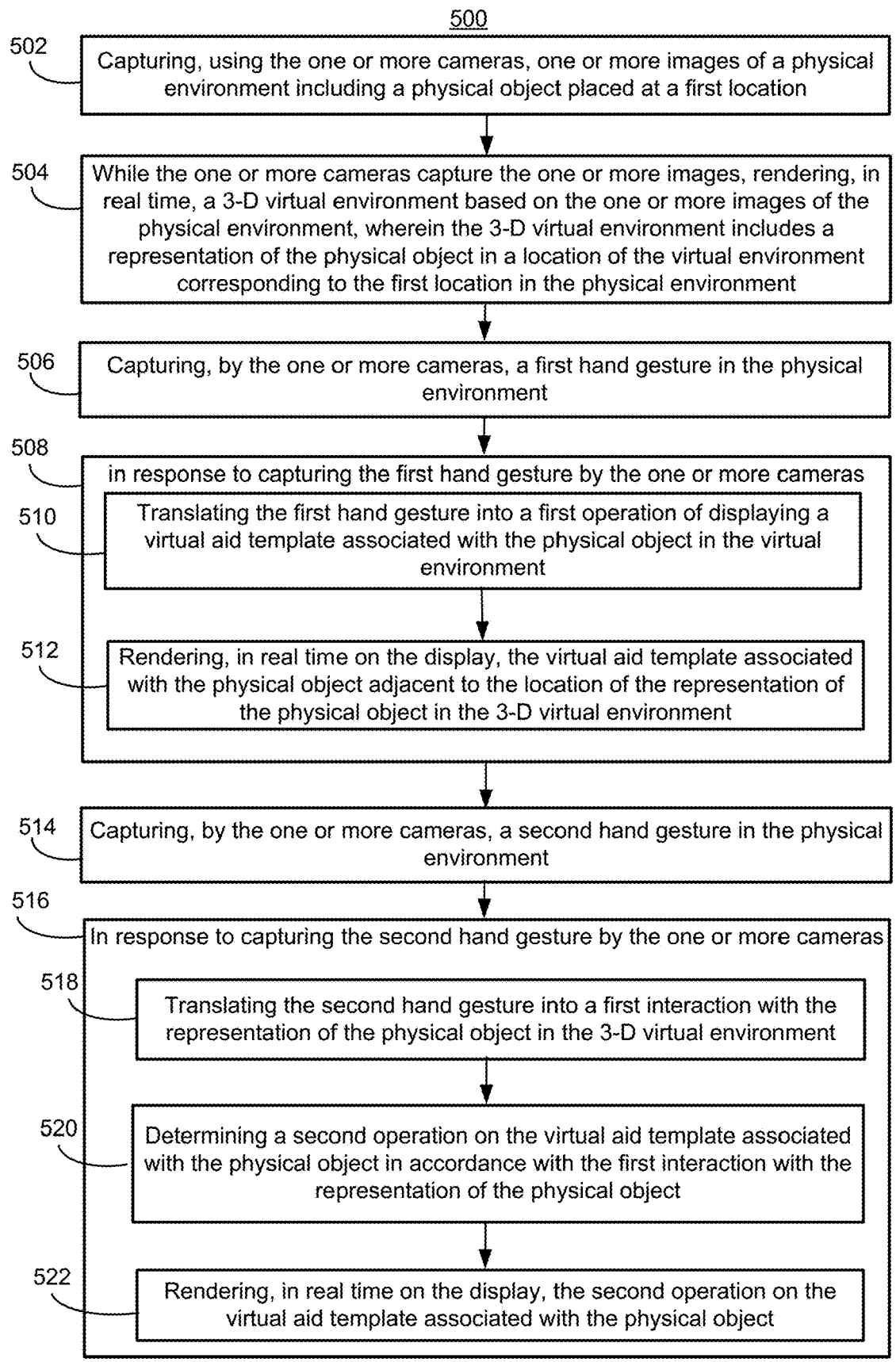
FIG. 5 is a flowchart diagram of a method of providing virtual guide for user interactions with object in accordance with some embodiments.

FIG. 5 is a flowchart diagram of a method 500 of rendering virtual aid templates associated with a physical object in accordance with a user's hand gesture that interacts with a representation of the physical object in a virtual environment, in accordance with some embodiments. In some embodiments, one or more steps of the method 500 are performed by a server system (e.g., a server system 104, FIG. 1). In some embodiments, one or more steps of the method 500 are performed by a client device 102 (e.g., a smart phone 102-1, a HMD 102-2, or a tablet 102-n, FIG. 1). In some embodiments, method 500 is governed by instructions that are stored in a non-transitory computer readable storage medium and the instructions are executed by one or more processors of the client and/or server systems. The method 500 is discussed with reference to user interface (UI) FIGS. 6A-6E as below.

Figure 6A:
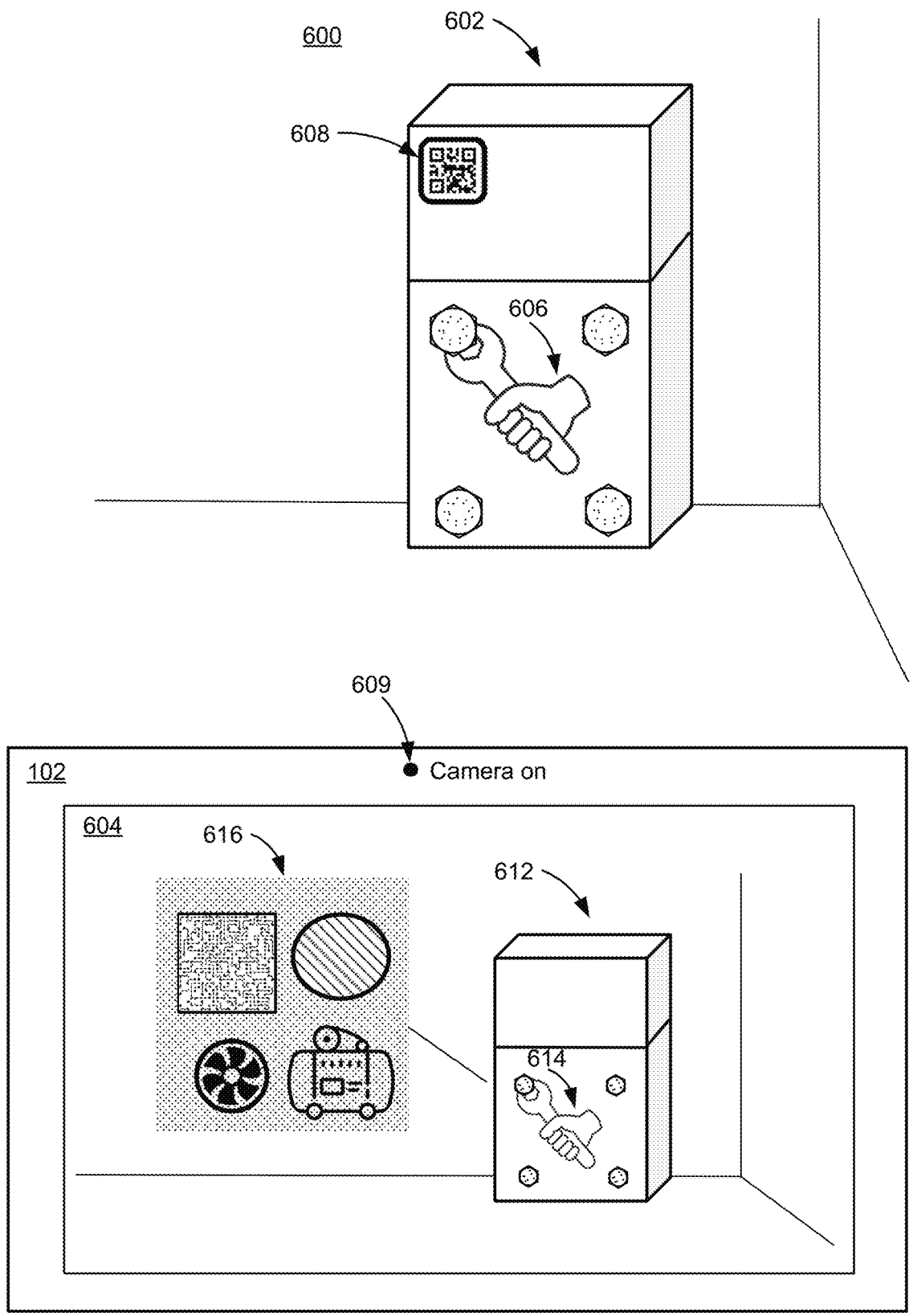
FIGS. 6A-6E illustrate examples of systems and user interfaces for providing virtual guide for user interactions with object in accordance with some embodiments.

In some embodiments, the method 500 can be used for onsite troubleshooting a malfunctioned machine. In some embodiments, the method 500 can be used to demonstrate assembling multiple components into a piece of furniture. In some embodiments, the method 500 can be used to demonstrate how to use a device, e.g., with multiple complex functions. In some embodiments as shown in FIG. 5, the method 500 includes: at an electronic device (e.g., a client device 102, such as a mobile phone 102-1, a head-mounted display (HMD) 102-2, or a tablet 102-*n*), having a display, one or more cameras), one or more processors, and memory: capturing (502), using the one or more cameras (e.g., cameras 609, FIG. 6A), one or more images (e.g., one or more photos or a video including multiple image frames) of a physical environment including a physical object (e.g., a broken fridge 602) placed at a first location in the physical environment (e.g., a kitchen 600). As shown in FIG. 6A, the field of the view of the camera(s) 609 capture at least a portion of the kitchen including the broken fridge 602.

While the one or more cameras capture the one or more images, the method 500 includes rendering (504), in real time, a 3-D virtual environment (e.g., 3-D virtual image 604, FIG. 6A) based on the one or more images of the physical environment (e.g., a broken fridge in the kitchen). In some embodiments as shown in FIG. 6A, the 3-D virtual environment 604 includes a representation (e.g., a 3-D virtual representation) of the physical object (e.g., the representation of the fridge 612, FIG. 6A) in a location of the virtual environment corresponding to the first location in the physical environment 600.

The method 500 further includes capturing (506), by the one or more cameras (e.g., the camera(s) 609, FIG. 6A), a first hand gesture (e.g., hand gesture 606, FIG. 6A) in the physical environment (e.g., kitchen 600). In some embodiments, the first hand gesture is a triggering event to initiate virtual aid display. In some embodiments, in response to capturing (508) the first hand gesture by the one or more cameras: the method 500 further includes translating (510) the first hand gesture (e.g., hand gesture 606, FIG. 6A) into a first operation (e.g., unfastening the screws of the back panel, unscrewing to remove a cover, FIG. 6A) of displaying a virtual aid template (e.g., virtual aid template 616, FIG. 6A) associated with the physical object (e.g., the fridge 602, FIG. 6A) in the virtual environment (e.g., the 3-D virtual environment 604, FIG. 6A); and rendering (512), in real time on the display, the virtual aid template (e.g., virtual aid template 616, FIG. 6A) associated with the physical object adjacent to the location of the representation of the physical object (e.g., the representation of the fridge 612, FIG. 6A) in the 3-D virtual environment (e.g., the 3-D virtual environment 604, FIG. 6A).

In some embodiments, the electronic device 102, or working cooperatively with the server system 104, can process images captured by the camera(s) 609 to understand the user's hand gesture. For example, as shown in FIG. 6A, the camera(s) 609 of the electronic device 102 capture the user's hand gesture 606. After analyzing the captured images, the user's hand gesture 606 is recognized to be unfastening the screws to remove a back cover of the lower compartment of the fridge. In some embodiments, the first hand gesture (e.g., unfastening screws to remove a back cover of the fridge) is a system predetermined or a user customized gesture to be associated with displaying a virtual aid template. In some embodiments as discussed in the present application, a representation of the hand gesture 614 is rendered in real time in the 3-D virtual environment 604 as the camera(s) 609 capture the hand gesture 606 in the kitchen. In some embodiments, the electronic device concurrently renders a representation of the first hand gesture 614 and a movement of the representation of the physical object corresponding to the second with the representation of the physical object caused by the first hand gesture (e.g., screws being unfastened and the back cover being removed to reveal inside of the lower compartment). As shown in FIG. 6A, in response to detecting the user's gesture to unfasten the screws to remove the back cover of the lower compartment of the fridge 602, the electronic device renders the virtual aid template 616, side-by-side and adjacent to the representation of the fridge 612. In some other embodiments, the virtual aid template 616 is rendered to overlay the representation of the fridge 612. In some embodiments, the virtual aid template 616 includes one or more items each corresponding to a particular diagnostic aid item, such as a user manual of the machine, a design blueprint, blow-up images showing inside structures, and/or circuit designs of the machine. In some embodiments, the camera(s) 609 of the electronic device 102 capture a machine-readable code (e.g., QR code 608) attached to the physical object (e.g., the broken fridge 602 in the kitchen 600). The electronic device can retrieve identification and model information of the physical object (e.g., the fridge 601) stored in the machine-readable code. The electronic device can then select the virtual aid template (e.g., the virtual aid template 616) in accordance with the identification and model information of the physical object (e.g., the broken fridge 602).

Figure 6B:
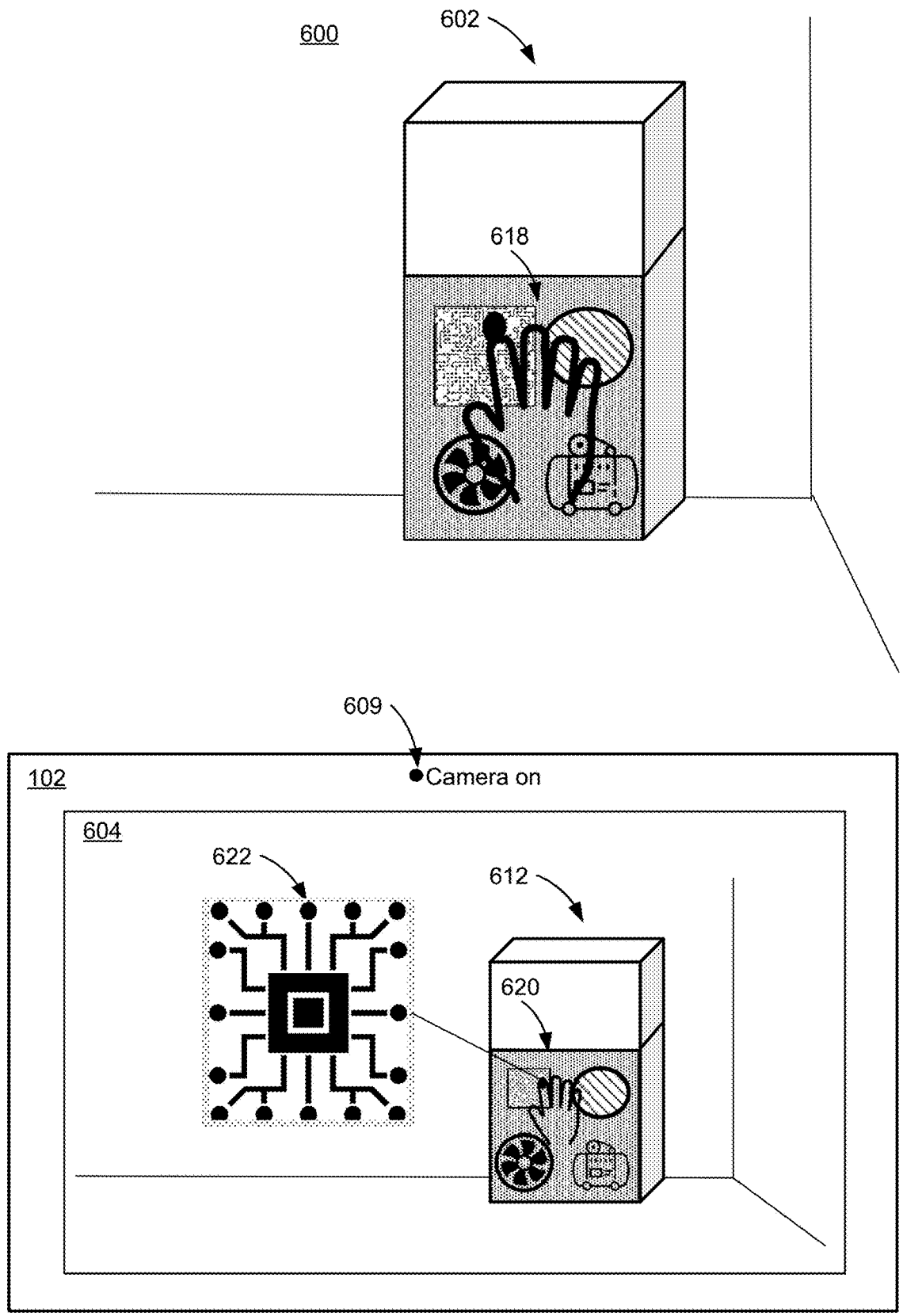

The method 500 further includes capturing (514), by the one or more cameras, a second hand gesture. As shown in FIG. 6B, in some embodiments, the second hand gesture is the user's hand gesture 618 to check (e.g., directly interacting with the physical part in the kitchen) an electronic component inside the lower compartment of the broken fridge in the kitchen 600. A representation of the hand gesture (620) can be rendered in real time in the 3-D virtual environment 604 as discussed in the present disclosure. In some embodiments, the second hand gesture is the user's hand gesture 618, which is performed by the user when the user is viewing the 3-D virtual environment 604 and intends to interact with the representation of the physical object 612. In some embodiments, the representation of the hand gesture 620 is displayed in real time as the camera(s) 609 capture the hand gesture 618 in the kitchen.

In response to capturing (516) the second hand gesture by the one or more cameras, the method 500 further includes translating (518) the second hand gesture (e.g., hand gesture 618, FIG. 6B) into a first interaction with the representation of the physical object in the 3-D virtual environment (e.g., checking/testing a representation of an electronic component inside the lower compartment of the fridge 620). The method 500 further includes determining (520) a second operation on the virtual aid template associated with the physical object (e.g., displaying a virtual circuit diagram 622 associated with the electronic component) in accordance with the first interaction with the representation of the physical object; and rendering (522), in real time on the display, the second operation on the virtual aid template associated with the physical object (e.g., displaying the virtual circuit diagram 622 of the electronic component to provide a visual reference to the user when trouble shooting the lower compartment of the fridge).

In some embodiments, the second hand gesture is a triggering event to adjust the 3-D virtual view concurrently with updating the virtual aid template. In some embodiments, for onsite troubleshooting a malfunctioned machine, the user needs to physically interact with the physical object to view the problem(s). For example, the second hand gesture is a physical interaction with a first part of the physical object, e.g., opening a fridge door to check why the freezer compartment's light is off, turning to a side of the machine, removing a cover to see the inside circuit of the machine, or checking and testing an electronic component (e.g., user gesture 618, FIG. 6B). In some embodiments, the hand position information (including depth information) and hand contour data can be analyzed to determine that the second hand gesture interacts with the particular electronic component. As a result, the 3-D virtual view 604 shows in real time a representation of opening the fridge door or a representation of testing the electronic component. Concurrently, the virtual aid template 622 is updated to show a circuit diagram of the corresponding electronic component as shown in FIG. 6B.

In some embodiments, for troubleshooting or other applications, such as product assembly, the second hand gesture interacts with the representation of the physical object in the 3-D virtual view, e.g., the second hand gesture 620 interacts with the representation of the fridge 612 in the 3-D virtual view 604 to turn the viewing angle of the representation of the fridge from front to side, without actually turning the electronic device, e.g., without turning the mobile phone or the HMD on the user's head, and without actually rotating the physical fridge 602 in the kitchen 600. In response to the second gesture, the electronic device renders that the representation of the fridge 612 turns concurrently with turning the virtual aid templates 616.

In some embodiments, the second operation on the virtual aid template is determined in accordance with a particular target part of the machine with which the second hand gesture is translated to interact. For example, after translating the second hand gesture (e.g., hand gesture 618 and corresponding representation of hand gesture 620) into the first interaction with a part of the representation of the physical object 620 (e.g., checking an electronic component), the second operation on the virtual aid template (e.g., selecting and rendering the circuit diagram 622 of the electronic component) is performed in accordance with a pre-stored relationship between multiple parts of the machine and virtual aid templates of the respective parts of the machine. For example, the circuit diagram 622 is selected based on the pre-stored relationship between the electronic component being checked by the second gesture and the circuit diagram of this electronic component.

In some embodiments as shown in FIG. 6B, in response to capturing the second hand gesture (e.g., hand gesture 618) by the one or more cameras (e.g., cameras 609), the electronic device concurrently renders, in real time on the display: (1) a representation of the second hand gesture (e.g., representation of the hand gesture 620), (2) a movement of the representation of the physical object caused by the first interaction with the representation of the physical object in the 3-D virtual environment (e.g., any movement caused by the hand gesture to the representation of the fridge 612 and/or to a representation of a component, e.g., the electronic component, of the fridge); and (3) the second operation on the virtual aid template associated with the physical object in accordance with the first interaction with the representation of the physical object (e.g., updating the virtual aid template to display the circuit diagram 622 of the electronic component, with which the second hand gesture interacts).

In some embodiments, in response to capturing the second hand gesture (e.g., hand gesture 618, FIG. 6B) by the one or more cameras (e.g., the cameras 609), the electronic device renders, on the display, a second interaction with the representation of the physical object in the virtual environment according to the second operation on the virtual aid template. In some embodiments, the second interaction with the representation of the physical object is a virtual fixing process of the representation of the physical object in accordance with the second operation, such as the user's hand gesture fixing the electronic component of the fridge while referencing to the updated circuit diagram 622 or a virtual video fixing demo.

Figure 6C:
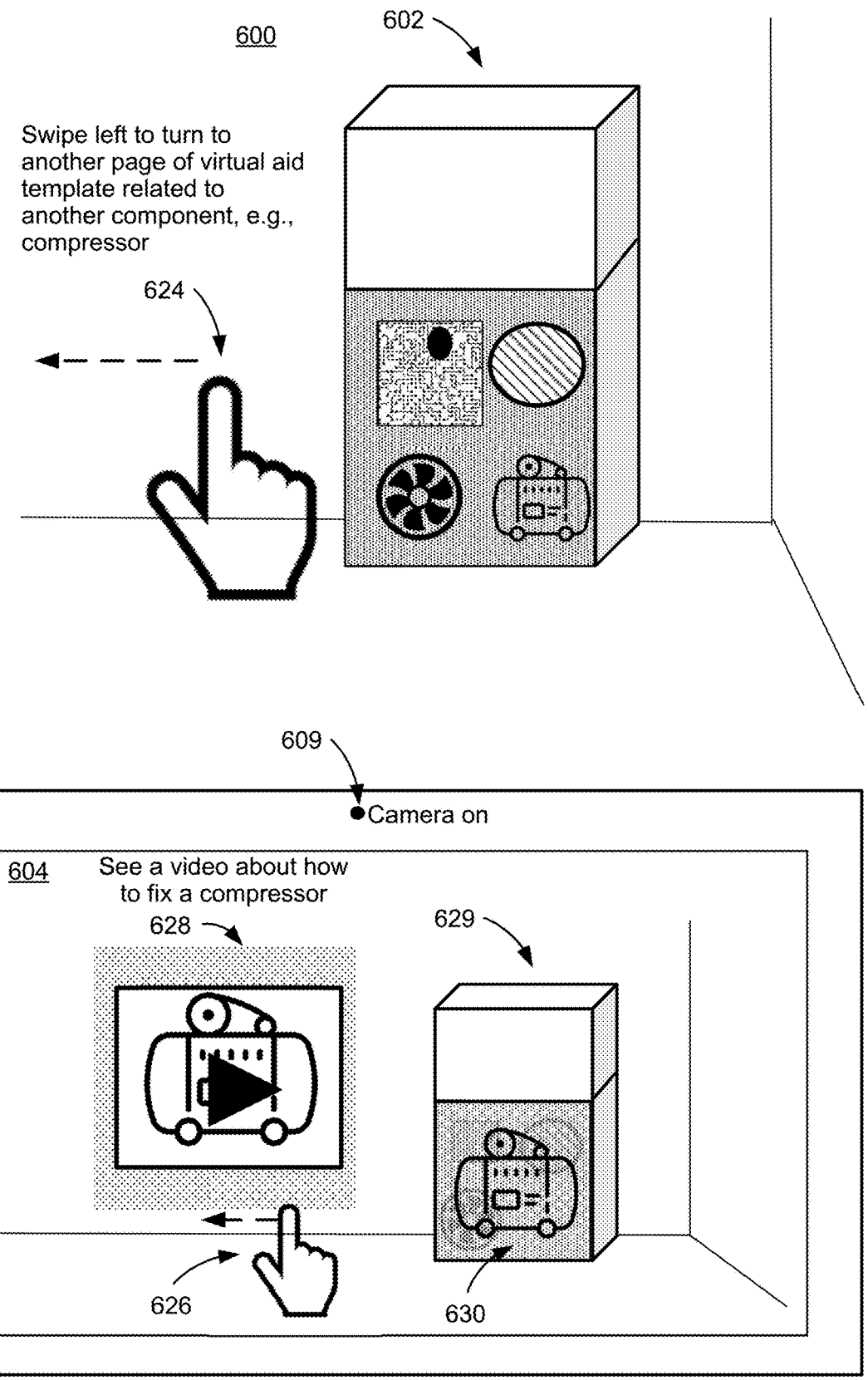

In some embodiments As shown in FIG. 6C, the camera(s) capture a third hand gesture (e.g., hand gesture 624) in the physical environment 600. In some embodiments, the hand gesture 624 is performed while the user is looking at the virtual aid template and intends to interact with the virtual aid template. For example, the user wants to use the hand gesture 624 in FIG. 6C, e.g., swiping to the left, to flip to another page or another item of the virtual aid template related to another component of the physical object.

In some embodiments, in response to capturing the third hand gesture by the one or more cameras, the electronic device 102, or working cooperatively with the server system 104, translates the third hand gesture into a third operation on the virtual aid template associated with the physical object. For example, the third operation includes turning pages or switching among items of virtual aid templates, rotating design view in the virtual aid templates, or zooming in or zooming out the rendered virtual aid templates.

In some embodiments, the electronic device 102 and/or the server system 104 determines a second representation of the physical object in the 3-D virtual environment (e.g., the representation of the fridge 629 in FIG. 6C) in accordance with the third operation on the virtual aid template associated with the physical object. In some embodiments, the second representation of the physical object is determined to include a particular part of the physical object according to the current view of the virtual aid template. In some embodiments, the electronic device 102 concurrently renders, in real time with rendering the third operation on the virtual aid template (e.g., turning to a virtual aid template of a video demo showing how to fix a compressor as shown in FIG. 6C) on the display, the second representation of the physical object (e.g., the representation of the physical object 629 including a zoomed-in view of the compressor 630, FIG. 6C) in the virtual environment according to the third operation on the virtual aid template. In one example, the second representation of the physical object may be rendered to overlay the previous first representation of the physical object in the 3-D virtual environment.

For example, as shown in FIG. 6C, the representation of the hand gesture 626 is rendered in the 3-D virtual view 604 concurrently with the cameras 609 capture the hand gesture 624 in the physical environment 600. After translating the hand gesture 624 to be a swipe to the left to flip to another page of virtual aid templates to view a video demo 628 of how to fix the compressor, the representation of the physical object 629 is updated according to the current view of the virtual aid template (e.g., the video demo 628). For example, the representation of the physical object 629 is updated to show a zoomed-in view of a particular part (e.g., compressor 630) associated with the video demo 628.

In some embodiments, the electronic device 102, or working cooperatively with the server system 104, identifies, without receiving any user input, one or more recommendation options (e.g., such as correcting possible defects of a part, solving possible problems of the machine, performing possible assembly steps from the present stage, performing possible functions of the panel in the current view) associated with the physical object in the physical environment based on camera data and/or image data of the one or more images. In response to capturing the first hand gesture by the one or more cameras, the electronic device renders the virtual aid template of a circuit diagram 642 associated with the physical object (e.g., the electronic component of the fridge) in accordance with the identified one or more recommendation options (e.g., correcting an error of the circuit board 636).

Figure 6D:
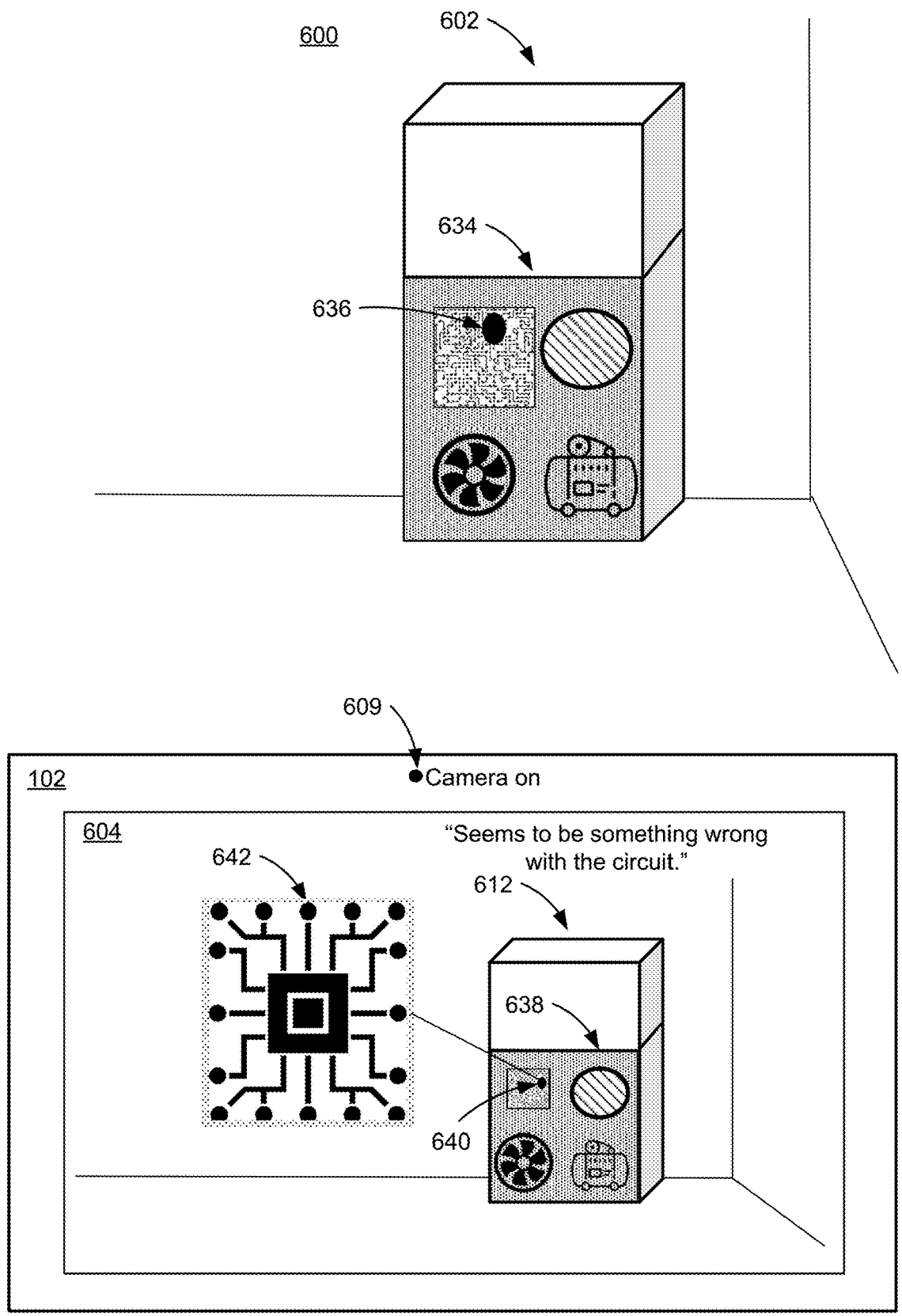

For example, as shown in FIG. 6D, after opening the back cover, based on the captured images of the circuit board 636, fan, and/or compressor behind the back cover of the fridge, the system can provide possible troubleshooting recommendations which are displayed in the virtual aid (e.g., the circuit design diagram 642 in FIG. 6D). The user may fix the electronic component on the circuit board 636 while referencing to the circuit diagram 642 of this electronic component. In some embodiments, the representation of the fridge 612 is also updated in pertinent part (e.g., the representation of the lower compartment 638), to concurrently show the representation of the erred electronic component 640. In some embodiments, a database that is constantly updated stores image data of common defects/errors associated with various parts of the physical object. The system can perform image recognition on images of the part with errors (e.g., charred compressor, clogged dusted filter, etc.), identify one or more defects/errors based on the error recommendation model (e.g., troubleshooting models 236 or 283, FIGS. 2A-2B), and provide recommendations by rendering useful virtual aid templates corresponding to the identified errors.

Figure 6E:
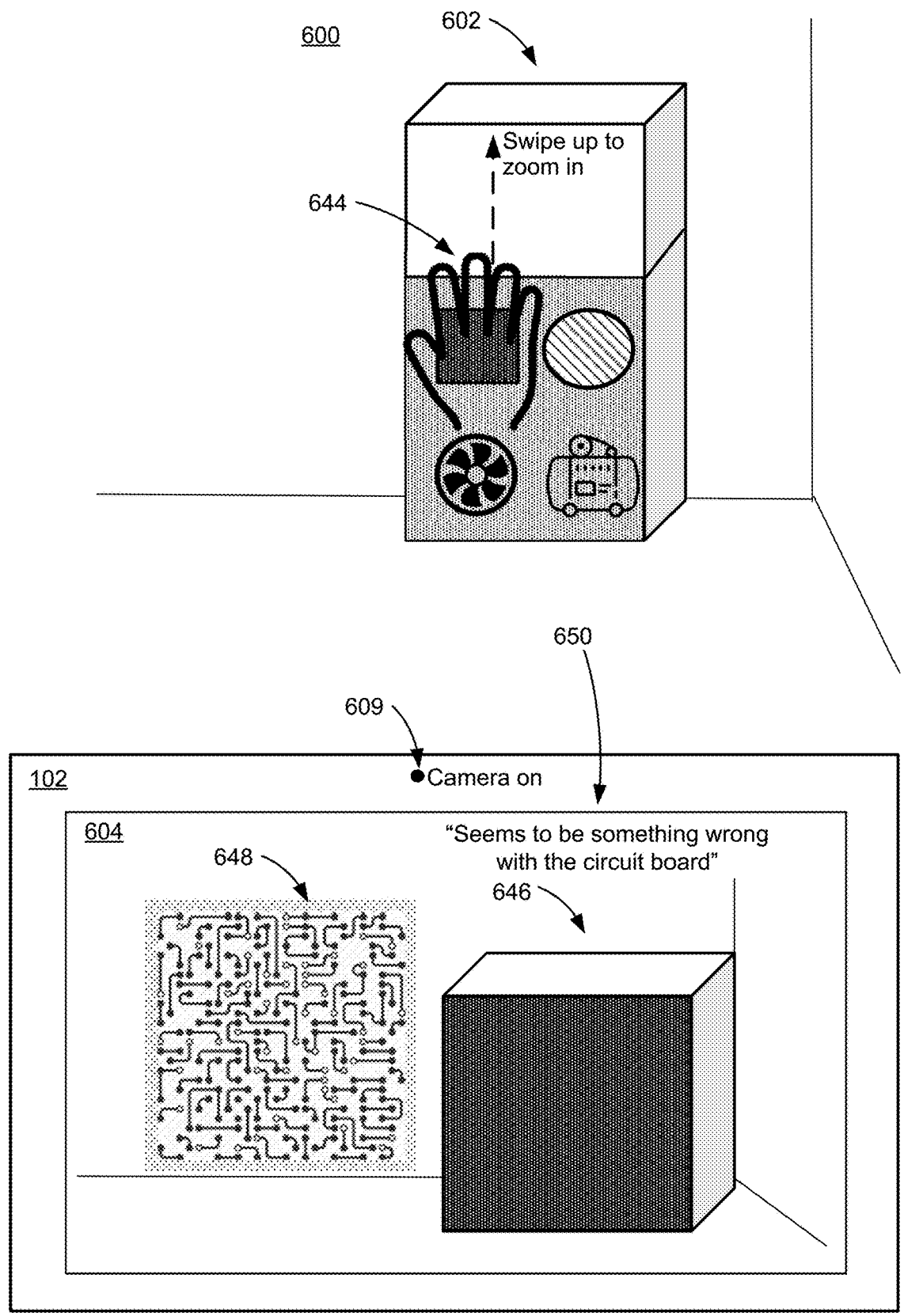

In some embodiments as shown in FIG. 6E, an interaction translated from a hand gesture (e.g., hand gesture 644, swipe up to zoom in the selected part, FIG. 6E) with the representation of the physical object in the 3-D virtual environment includes providing a zoomed-in view of a first part (e.g., a zoomed-in view 646 of the circuit board part) of the representation of the physical object in the 3-D virtual environment. In some embodiments, rendering the second operation on the virtual aid template associated with the physical object comprises: concurrently rendering, in real time on the display: (1) the second operation to one or more virtual aid items of the virtual aid template (e.g., rendering the circuit board design 648) associated with the first part of the representation of the physical object (e.g., the representation of the circuit board part 646); and (2) the zoomed-in view of the first part of the representation of the physical object (e.g., the zoomed-in representation of the circuit board part 646) in the 3-D virtual environment. As discussed in FIG. 6E, the 3-D virtual view can be used as a "magnifier" by rendering a zoomed-in view of a specific part selected by a user's hand gesture. Moreover, the virtual aid template for the particular part can be rendered side-by-side, such that the user can inspect and fix the component using both a "magnifier" and a virtual reference conveniently rendered side-by-side next to the representation of the object.

While particular embodiments are described above, it will be understood it is not intended to limit the application to these particular embodiments. On the contrary, the application includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Each of the above-identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, memory 806, optionally, stores a subset of the modules and data structures identified above. Furthermore, memory 806, optionally, stores additional modules and data structures not described above.

What is claimed is:

1. A method, comprising:
at a computer system having a planar display, one or more cameras, one or more processors, and memory:
 rendering, on the planar display, a 3-D virtual environment based on one or more images of a physical environment, wherein the 3-D virtual environment includes one or more representations of physical objects placed in the physical environment;
 receiving a user input to place a first preset virtual object from a first location on the planar display, outside the 3-D virtual environment to a second location in the 3-D virtual environment that corresponds to a space in the physical environment;
 rendering, in response to the user input, the first preset virtual object placed in the second location in the 3-D virtual environment;
 detecting, by the one or more cameras, a user's hand gesture interacting with the first preset virtual object in the 3-D virtual environment;
 in response to detecting the user's hand gesture,
  translating the user's hand gesture into an interaction with the first preset virtual object in the 3-D virtual environment;
  identifying, in the 3-D virtual environment, a first part of the first preset virtual object in the virtual environment that is subject to the interaction with the first preset virtual object in the virtual environment;
  concurrently displaying in real time on the planar display:
   a representation of the user's hand gesture in the 3-D virtual environment;
 a movement of the first part of the first preset virtual object caused by the interaction with the first preset virtual object in the 3-D virtual environment;
 while concurrently displaying in real time the representation of the user's hand gesture and the movement of the first part of the first preset virtual object caused by the interaction with the first preset virtual object in the 3-D virtual environment:
 capturing one or more facial expressions of the user in response to the user viewing the movement of the first part of the first preset virtual object caused by the interaction with the first preset virtual object;
 identifying a negative facial expression of the user in response to viewing a first movement of the first part of the first preset virtual object caused by a first interaction with the first preset virtual object in the 3-D virtual environment;
 automatically selecting, without receiving any user input, a second preset virtual object from a preset product database; and updating the 3-D virtual environment to display the second preset virtual object in the space of the 3-D virtual environment to replace the first preset virtual object.

2. The method of claim 1, further comprising:
displaying dimension data associated with one or more representations of physical objects in the 3-D virtual environment, wherein dimension data associated with a respective representation of a physical object corresponds to a dimension of the corresponding physical object in the physical environment.

3. The method of claim 2, further comprising:
concurrently updating, in real time in the 3-D virtual environment, dimension data of the first preset virtual object and dimension data associated with one or more representations of physical object in proximity to the space to place the first preset virtual object in accordance with the interaction with the first preset virtual object caused by the user's hand gesture.

4. The method of claim 2, further comprising:
displaying virtual fitting results of the first preset virtual object in the 3-D virtual environment in accordance with the dimension data associated with one or more representations of physical objects.

5. The method of claim 2, further comprising:
selecting, without receiving any user input, one or more products from a preset product database to be placed in one or more spaces of the physical environment in accordance with dimensions of the one or more physical objects;
updating the 3-D virtual environment to display one or more preset virtual objects of the selected one or more products in one or more spaces of the 3-D virtual environment corresponding to the one or more spaces of the physical environment.

6. The method of claim 1, wherein the user's hand gesture includes one or more selected from:
moving the first preset virtual object from a first location to a second location in the 3-D virtual environment;
swapping the first preset virtual object with a second preset virtual object to be placed in the space in the 3-D virtual environment;
interacting with the first part of the first preset virtual object; and
activating a function of a product corresponding to the first preset virtual object.

7. A computer system, comprising:
a planar display;
one or more cameras;
one or more processors; and
memory storing instructions which when executed by the one or more processors, cause the processors to perform operations comprising:
rendering, on the planar display, a 3-D virtual environment based on one or more images of a physical environment, wherein the 3-D virtual environment includes one or more representations of physical objects placed in the physical environment;
receiving a user input to place a first preset virtual object from a first location on the planar display, outside the 3-D virtual environment to a second location in the 3-D virtual environment that corresponds to a space in the physical environment;
rendering, in response to the user input, the first preset virtual object placed in the second location in the 3-D virtual environment;
detecting, by the one or more cameras, a user's hand gesture interacting with the first preset virtual object in the 3-D virtual environment;
in response to detecting the user's hand gesture,
translating the user's hand gesture into an interaction with the first preset virtual object in the 3-D virtual environment;
identifying, in the 3-D virtual environment, a first part of the first preset virtual object in the virtual environment that is subject to the interaction with the first preset virtual object in the virtual environment;
concurrently displaying in real time on the planar display:
a representation of the user's hand gesture in the 3-D virtual environment;
a movement of the first part of the first preset virtual object caused by the interaction with the first preset virtual object in the 3-D virtual environment;
while concurrently displaying in real time the representation of the user's hand gesture and the movement of the first part of the first preset virtual object caused by the interaction with the first preset virtual object in the 3-D virtual environment:
capturing one or more facial expressions of the user in response to the user viewing the movement of the first part of the first preset virtual object caused by the interaction with the first preset virtual object;
identifying a negative facial expression of the user in response to viewing a first movement of the first part of the first preset virtual object caused by a first interaction with the first preset virtual object in the 3-D virtual environment;
automatically selecting, without receiving any user input, a second preset virtual object from a preset product database; and
updating the 3-D virtual environment to display the second preset virtual object in the space of the 3-D virtual environment to replace the first preset virtual object.

8. The computer system of claim 7, wherein the operations further include:
displaying dimension data associated with one or more representations of physical objects in the 3-D virtual environment, wherein dimension data associated with a respective representation of a physical object corresponds to a dimension of the corresponding physical object in the physical environment.

9. The computer system of claim 8, wherein the operations further include:
concurrently updating, in real time in the 3-D virtual environment, dimension data of the first preset virtual object and dimension data associated with one or more representations of physical object in proximity to the space to place the first preset virtual object in accordance with the interaction with the first preset virtual object caused by the user's hand gesture.

10. The computer system of claim 8, wherein the operations further include:
displaying virtual fitting results of the first preset virtual object in the 3-D virtual environment in accordance with the dimension data associated with one or more representations of physical objects.

11. The computer system of claim 8, wherein the operations further include:
selecting, without receiving any user input, one or more products from a preset product database to be placed in one or more spaces of the physical environment in accordance with dimensions of the one or more physical objects;

updating the 3-D virtual environment to display one or more preset virtual objects of the selected one or more products in one or more spaces of the 3-D virtual environment corresponding to the one or more spaces of the physical environment.

12. The computer system of claim 7, wherein the user's hand gesture includes one or more selected from:

moving the first preset virtual object from a first location to a second location in the 3-D virtual environment;

swapping the first preset virtual object with a second preset virtual object to be placed in the space in the 3-D virtual environment;

interacting with the first part of the first preset virtual object; and activating a function of a product corresponding to the first preset virtual object.

13. A non-transitory computer-readable storage medium storing instructions, the instructions, when executed by the one or more processors, cause one or more processors to perform operations comprising:

rendering, on a planar display of a computer system, a 3-D virtual environment based on one or more images of a physical environment, wherein the 3-D virtual environment includes one or more representations of physical objects placed in the physical environment;

receiving a user input to place a first preset virtual object from a first location on the planar display, outside the 3-D virtual environment to a second location in the 3-D virtual environment that corresponds to a space in the physical environment;

rendering, in response to the user input, the first preset virtual object placed in the second location in the 3-D virtual environment;

detecting, by one or more cameras of the computer system, a user's hand gesture interacting with the first preset virtual object in the 3-D virtual environment;

in response to detecting the user's hand gesture, translating the user's hand gesture into an interaction with the first preset virtual object in the 3-D virtual environment;

identifying, in the 3-D virtual environment, a first part of the first preset virtual object in the virtual environment that is subject to the interaction with the first preset virtual object in the virtual environment;

concurrently displaying in real time on the planar display:

a representation of the user's hand gesture in the 3-D virtual environment;

a movement of the first part of the first preset virtual object caused by the interaction with the first preset virtual object in the 3-D virtual environment;

while concurrently displaying in real time the representation of the user's hand gesture and the movement of the first part of the first preset virtual object caused by the interaction with the first preset virtual object in the 3-D virtual environment:

capturing one or more facial expressions of the user in response to the user viewing the movement of the first part of the first preset virtual object caused by the interaction with the first preset virtual object;

identifying a negative facial expression of the user in response to viewing a first movement of the first part of the first preset virtual object caused by a first interaction with the first preset virtual object in the 3-D virtual environment;

automatically selecting, without receiving any user input, a second preset virtual object from a preset product database; and updating the 3-D virtual environment to display the second preset virtual object in the space of the 3-D virtual environment to replace the first preset virtual object.

14. The computer-readable storage medium of claim 13, wherein the operations further include:

displaying dimension data associated with one or more representations of physical objects in the 3-D virtual environment, wherein dimension data associated with a respective representation of a physical object corresponds to a dimension of the corresponding physical object in the physical environment.

15. The computer-readable storage medium of claim 14, wherein the operations further include:

concurrently updating, in real time in the 3-D virtual environment, dimension data of the first preset virtual object and dimension data associated with one or more representations of physical object in proximity to the space to place the first preset virtual object in accordance with the interaction with the first preset virtual object caused by the user's hand gesture.

16. The computer-readable storage medium of claim 14, wherein the operations further include:

displaying virtual fitting results of the first preset virtual object in the 3-D virtual environment in accordance with the dimension data associated with one or more representations of physical objects.

17. The computer-readable storage medium of claim 14, wherein the operations further include:

selecting, without receiving any user input, one or more products from a preset product database to be placed in one or more spaces of the physical environment in accordance with dimensions of the one or more physical objects;

updating the 3-D virtual environment to display one or more preset virtual objects of the selected one or more products in one or more spaces of the 3-D virtual environment corresponding to the one or more spaces of the physical environment.

* * * * *